US012775310B2

(12) United States Patent
Wang et al.

(10) Patent No.: US 12,775,310 B2
(45) Date of Patent: Oct. 27, 2026

(54) HINGE ANGLE DETECTION METHOD AND RELATED DEVICE

(71) Applicant: HONOR DEVICE CO., LTD., Shenzhen (CN)

(72) Inventors: Peng Wang, Shenzhen (CN); Xianzhao Jia, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 510 days.

(21) Appl. No.: 18/031,432

(22) PCT Filed: Aug. 29, 2022

(86) PCT No.: PCT/CN2022/115421
§ 371 (c)(1),
(2) Date: Apr. 12, 2023

(87) PCT Pub. No.: WO2023/087832
PCT Pub. Date: May 25, 2023

(65) Prior Publication Data

US 2024/0302867 A1 Sep. 12, 2024

(30) Foreign Application Priority Data

Nov. 19, 2021 (CN) ......................... 202111398160.2

(51) Int. Cl.
*G06F 1/16* (2006.01)
*G06F 3/01* (2006.01)

(52) U.S. Cl.
CPC .......... *G06F 1/1677* (2013.01); *G06F 1/1618* (2013.01); *G06F 3/017* (2013.01)

(58) Field of Classification Search
CPC .. G06F 1/1677; G06F 1/1618; H04M 1/0214; H04M 1/0243; H04M 1/0216
See application file for complete search history.

(56) References Cited

U.S. PATENT DOCUMENTS 10,073,668 B2 9/2018 Chun et al.
10,976,150 B2 4/2021 Zancanato et al.
(Continued)

FOREIGN PATENT DOCUMENTS

CN 107543546 A * 1/2018
CN 108027650 A 5/2018
(Continued)

*Primary Examiner* — Shelby A Turner
*Assistant Examiner* — Cynthia L Davis
(74) *Attorney, Agent, or Firm* — WOMBLE BOND DICKINSON (US) LLP

(57) ABSTRACT

This application discloses a hinge angle detection method and a related device, to accurately calculate a hinge angle of a foldable screen. A specific solution is applied to a foldable electronic device. The foldable electronic device includes a first screen and a second screen. A motion status of the electronic device and a relative position between a common axis and a horizontal plane are determined, and then a target algorithm is determined based on the motion status and the relative position. For the current motion status and relative position, accuracy of calculating a hinge angle by using the determined target algorithm is relatively high. The target algorithm includes an acceleration sensor algorithm, a gyroscope sensor algorithm, or a fusion algorithm. The fusion algorithm is an algorithm of fusing data of an acceleration sensor and data of a gyroscope sensor to calculate a hinge angle.

16 Claims, 20 Drawing Sheets

(56) References Cited

U.S. PATENT DOCUMENTS

| | | | | |
|---|---|---|---|---|
| 11,206,323 | B2 | 12/2021 | Liao | |
| 11,809,237 | B2 | 11/2023 | Cui et al. | |
| 2012/0120627 | A1 | 5/2012 | O'Connor et al. | |
| 2018/0039408 | A1* | 2/2018 | Cheong | G06F 3/0481 |
| 2021/0041912 | A1* | 2/2021 | Eom | G06F 3/017 |
| 2021/0348911 | A1 | 11/2021 | Rizzardini et al. | |
| 2022/0350373 | A1* | 11/2022 | Cui | G06F 1/1677 |
| 2022/0413553 | A1 | 12/2022 | Zhang | |
| 2023/0044497 | A1 | 2/2023 | Zhang et al. | |
| 2023/0239391 | A1* | 7/2023 | Zhou | H04M 1/0243<br>455/418 |

FOREIGN PATENT DOCUMENTS

| | | | | |
|---|---|---|---|---|
| CN | 108413960 | A | 8/2018 | |
| CN | 108958362 | A | 12/2018 | |
| CN | 109001787 | A | 12/2018 | |
| CN | 110045936 | A | 7/2019 | |
| CN | 110307821 | A | 10/2019 | |
| CN | 110417961 | A | 11/2019 | |
| CN | 110536004 | A | 12/2019 | |
| CN | 111263005 | A | 6/2020 | |
| CN | 112099717 | A | 12/2020 | |
| CN | 112991957 | A | 6/2021 | |
| CN | 110536004 | B | 8/2021 | |
| EP | 4131910 | A1 | 2/2023 | |
| WO | WO-2004041086 | A1 * | 5/2004 | A61B 5/1118 |
| WO | 2019019883 | A1 | 1/2019 | |
| WO | 2020187170 | A1 | 9/2020 | |
| WO | 2021008616 | A1 | 1/2021 | |
| WO | 2021104008 | A1 | 6/2021 | |
| WO | 2021128245 | A1 | 7/2021 | |
| WO | 2021209047 | A1 | 10/2021 | |

* cited by examiner

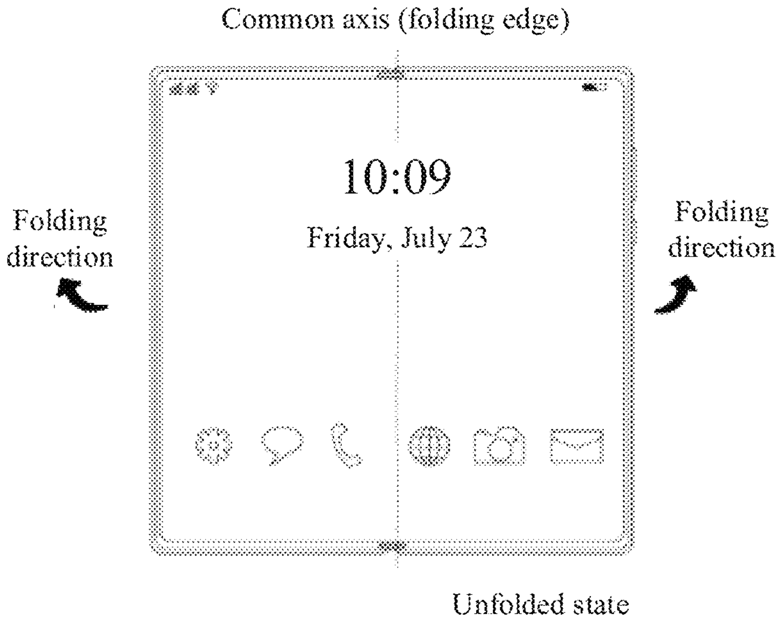
FIG. 1a(1)

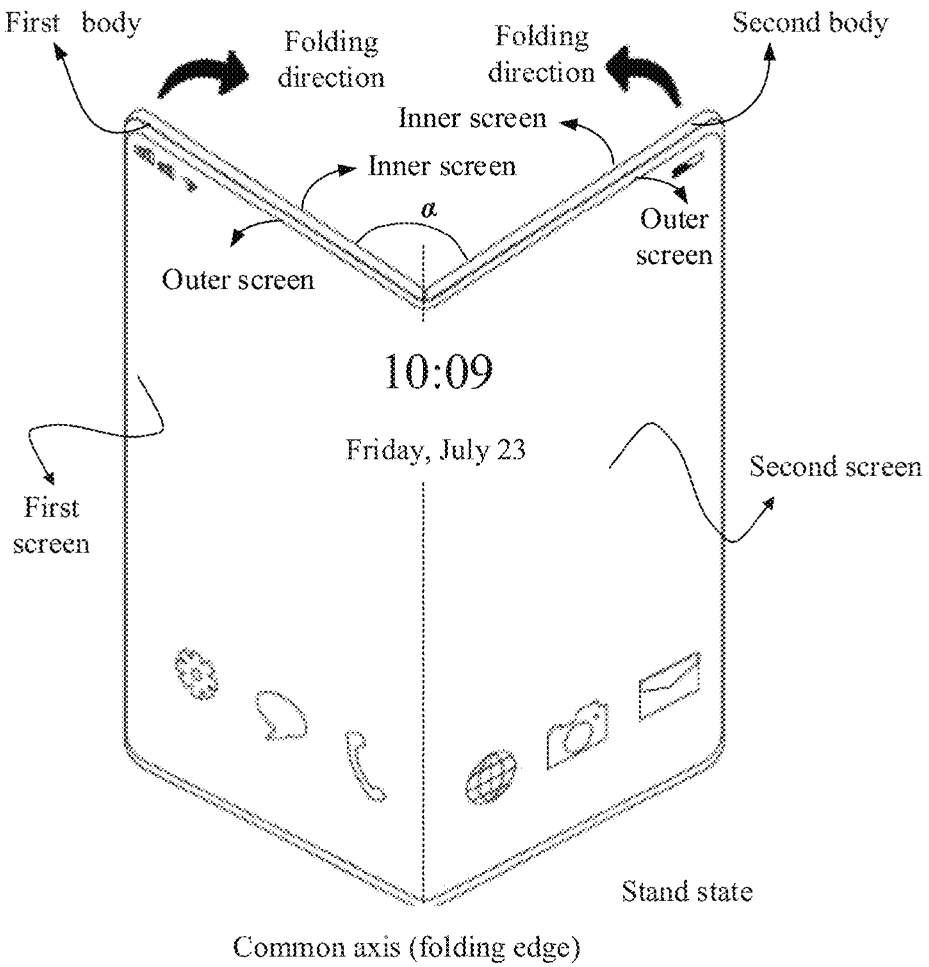
FIG. 1a(2)

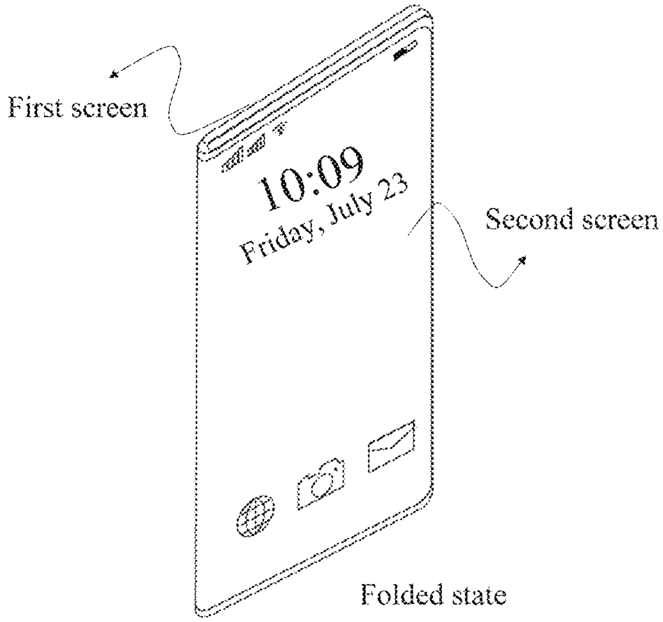
FIG. 1a(3)

HINGE ANGLE DETECTION METHOD AND RELATED DEVICE

CROSS-REFERENCE TO RELATED APPLICATIONS

This application is a National Stage of International Application No. PCT/CN2022/115421 filed on Aug. 29, 2022, which claims priority to Chinese Patent Application No. 202111398160.2 filed on Nov. 19, 2021, both of which are incorporated herein by references in their entireties.

TECHNICAL FIELD

This application relates to the field of foldable screen technologies, and in particular, to a hinge angle detection method and a related device.

BACKGROUND

With gradual maturity of foldable screen technologies, there are increasingly more foldable phones on the market. To improve user experience of using foldable phones, many developers develop a series of functions associated with the foldable screen technologies. For example, a function of adaptively displaying a played video in a large-screen manner after the foldable phone is unfolded is designed.

However, in a process of implementing the series of functions, a current hinge angle of the foldable phone usually needs to be obtained, to determine a current posture of the foldable phone. Therefore, an existing foldable phone has a requirement for obtaining an accurate hinge angle.

SUMMARY

This application provides a hinge angle detection method and a related device, to obtain an accurate hinge angle.

To achieve the foregoing objective, this application provides the following technical solutions.

According to a first aspect, this application discloses a hinge angle detection method, applied to a foldable electronic device. A foldable screen of the foldable electronic device includes a first screen and a second screen, and the hinge angle detection method includes: determining a motion status of the electronic device and a relative position between a common axis and a horizontal plane, where the common axis is an axis on which a folding edge of the foldable screen is located; then determining a target algorithm based on the motion status and the relative position, where the target algorithm includes an acceleration sensor algorithm, a gyroscope sensor algorithm, or a fusion algorithm, and the fusion algorithm is an algorithm of fusing data of an acceleration sensor and data of a gyroscope sensor to calculate a hinge angle; and finally calculating a hinge angle of the electronic device by using the determined target algorithm, where the hinge angle is an included angle between the first screen and the second screen.

According to the hinge angle detection method in this application, the target algorithm is determined based on the determined motion status of the foldable electronic device and a determined relative position relationship between the common axis and the horizontal plane, and then the hinge angle is calculated by using the target algorithm, so that a more accurate hinge angle can be obtained. In this embodiment of this application, in a hinge angle detection process, impact caused by the motion status and the relative position relationship between the common axis of the foldable screen and the horizontal plane on accuracy of calculating the hinge angle by using different algorithms is considered, so that a more accurate hinge angle can be calculated, and a function that needs to use the hinge angle in the electronic device is optimized.

In a possible implementation, the motion status of the electronic device includes: the electronic device is in a still state or is not in a still state. The relative position between the common axis and the horizontal plane includes: the common axis is perpendicular to the horizontal plane or the common axis is not perpendicular to the horizontal plane.

In another possible implementation, the determining a target algorithm based on the motion status and the relative position includes: determining the acceleration sensor algorithm as the target algorithm if the electronic device is in the still state; determining the fusion algorithm or the gyroscope sensor algorithm as the target algorithm if the electronic device is not in the still state and the common axis is not perpendicular to the horizontal plane; or determining the gyroscope sensor algorithm as the target algorithm if the electronic device is not in the still state and the common axis is perpendicular to the horizontal plane.

In another possible implementation, the determining a motion status of the electronic device includes: if a difference between a norm of an acceleration vector of the electronic device and a gravitational acceleration is less than or equal to a first preset value, considering that the norm of the acceleration vector is close to a value of the gravitational acceleration, and determining that the motion status of the electronic device is the still state; or if the difference between the norm of the acceleration vector and the gravitational acceleration is greater than the first preset value, considering that the norm of the acceleration vector is not close to the value of the gravitational acceleration, and determining that the motion status of the electronic device is not the still state.

In another possible implementation, the determining a relative position between a common axis and a horizontal plane includes: if a difference between a component of the acceleration vector on the common axis and the gravitational acceleration is less than or equal to a first preset value, considering that the component of the acceleration vector on the common axis is close to the gravitational acceleration, and determining that the common axis is perpendicular to the horizontal plane; or if the difference between the component of the acceleration vector on the common axis and the gravitational acceleration is greater than the first preset value, considering that the component of the acceleration vector on the common axis is not close to the gravitational acceleration, and determining that the common axis is not perpendicular to the horizontal plane.

In another possible implementation, the calculating a hinge angle of the electronic device by using the determined target algorithm includes: calculating the hinge angle of the electronic device by using the determined target algorithm if determining that the hinge angle changes.

In another possible implementation, the determining that the hinge angle changes includes: if a difference between an angular velocity difference and zero is greater than a second preset value, determining that the hinge angle changes. The angular velocity difference is a difference between an angular velocity of a first gyroscope sensor around the common axis and an angular velocity of a second gyroscope sensor around the common axis. The first gyroscope sensor is disposed in a body corresponding to the first screen, and the second gyroscope sensor is disposed in a body corresponding to the second screen.

In another possible implementation, the determining a motion status of the electronic device and a relative position between a common axis and a horizontal plane includes: determining the motion status of the electronic device and the relative position between the common axis and the horizontal plane if determining that the foldable screen is not in a closed state.

In another possible implementation, the determining that the foldable screen is not in a closed state includes: determining, based on magnetic force data, that the foldable screen is not in the closed state. The magnetic force data is obtained by a magnetic sensor by detecting magnetic field strength of a magnet, the magnetic sensor is disposed in the body corresponding to the first screen, and the magnet is disposed in the body corresponding to the second screen.

In another possible implementation, the determining, based on magnetic force data, that the foldable screen is not in the closed state includes: if the magnetic force data is less than or equal to a first preset magnetic force value, determining that the foldable screen is not in the closed state.

In another possible implementation, if the target algorithm is the fusion algorithm, the calculating a hinge angle of the electronic device by using the determined target algorithm includes: obtaining the hinge angle of the electronic device through calculation by using the fusion algorithm based on the angular velocity around the common axis that is collected by the first gyroscope sensor, the angular velocity around the common axis that is collected by the second gyroscope sensor, a hinge angle calculated by using the acceleration sensor algorithm, a sampling cycle, a process covariance, and a key parameter measurement error. The fusion algorithm is constructed based on a Kalman filtering algorithm, the first gyroscope sensor is disposed in the body corresponding to the first screen, and the second gyroscope sensor is disposed in the body corresponding to the second screen.

In another possible implementation, if the target algorithm is the acceleration sensor algorithm, the calculating a hinge angle of the electronic device by using the determined target algorithm includes: obtaining the hinge angle of the electronic device through calculation by using the acceleration sensor algorithm based on a projection vector of the acceleration vector on an x1o1z1 plane of a first-screen coordinate system and a projection vector of the acceleration vector on an x2o2z2 plane of a second-screen coordinate system. The projection vector of the acceleration vector on the x1o1z1 plane of the first-screen coordinate system is collected by a first acceleration sensor, the projection vector of the acceleration vector on the x2o2z2 plane of the second-screen coordinate system is collected by a second acceleration sensor, the first acceleration sensor is disposed in the body corresponding to the first screen, the second acceleration sensor is disposed in the body corresponding to the second screen, and a y1-axis of the first-screen coordinate system is parallel to a y2-axis of the second-screen coordinate system.

In another possible implementation, if the target algorithm is the gyroscope sensor algorithm, the calculating a hinge angle of the electronic device by using the determined target algorithm includes: obtaining the hinge angle of the electronic device through calculation by using the gyroscope sensor algorithm based on the angular velocity around the common axis that is collected by the first gyroscope sensor, the angular velocity around the common axis that is collected by the second gyroscope sensor, a hinge angle calculated last time, and the sampling cycle. The first gyroscope sensor is disposed in the body corresponding to the first screen, and the second gyroscope sensor is disposed in the body corresponding to the second screen.

According to a second aspect, this application discloses a foldable electronic device, including: a foldable screen, where the foldable screen includes a first screen and a second screen; one or more processors; and a memory, storing a program. When the program is executed by the one or more processors, the foldable electronic device is enabled to perform the hinge angle detection method according to any one of the possible implementations of the first aspect.

BRIEF DESCRIPTION OF DRAWINGS

FIG. 1*a*(1) to FIG. 1*a*(3) are a schematic diagram of a change of a foldable phone in an unfolding and folding process according to an embodiment of this application;

DESCRIPTION OF EMBODIMENTS

The terms "first", "second", "third", and the like in the specification, claims, and accompanying drawings of this application are used to distinguish between different objects, but are not used to limit a specific sequence.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

With gradual maturity of foldable screen technologies, there are increasingly more foldable phones on the market. As shown in FIG. 1*a*(1) to FIG. 1*a*(3), a foldable screen of a foldable phone includes a first screen and a second screen. The foldable screen is folded according to a folding edge to form the first screen and the second screen. A virtual axis on which the folding edge is located is a common axis. The first screen may include an inner screen and an outer screen of the first screen, and the second screen may also include an inner screen and an outer screen of the second screen. The inner screen is a screen located inside when the foldable screen is in a folded state, and the outer screen is a screen located outside in a closed state. An included angle between the first screen and the second screen is a hinge angle $\alpha$ of the foldable phone. The foldable phone includes a body corresponding to the first screen (briefly referred to as a first body) and a body corresponding to the second screen (briefly referred to as a second body). The first body and the second body are connected by using a connection shaft.

A form of the foldable phone may be changed according to a requirement of a user. For example, when the user wants to conveniently carry the foldable phone, the foldable phone may be folded. In a folding process, a phone form may be changed in an order of (1) an unfolded state, (2) a stand state, and (3) a folded state in a folding direction shown in FIG. 1*a*(1) to FIG. 1*a*(3). When the user wants to watch a video on a large screen, the foldable phone may be unfolded. As shown in FIG. 1*a*(1) to FIG. 1*a*(3), the foldable phone may be unfolded. In an unfolding process, a phone form of the foldable phone may be changed in an order of (3) a folded state, (2) a stand state, and (1) an unfolded state shown in FIG. 1*a*(1) to FIG. 1*a*(3).

Figure 1B:
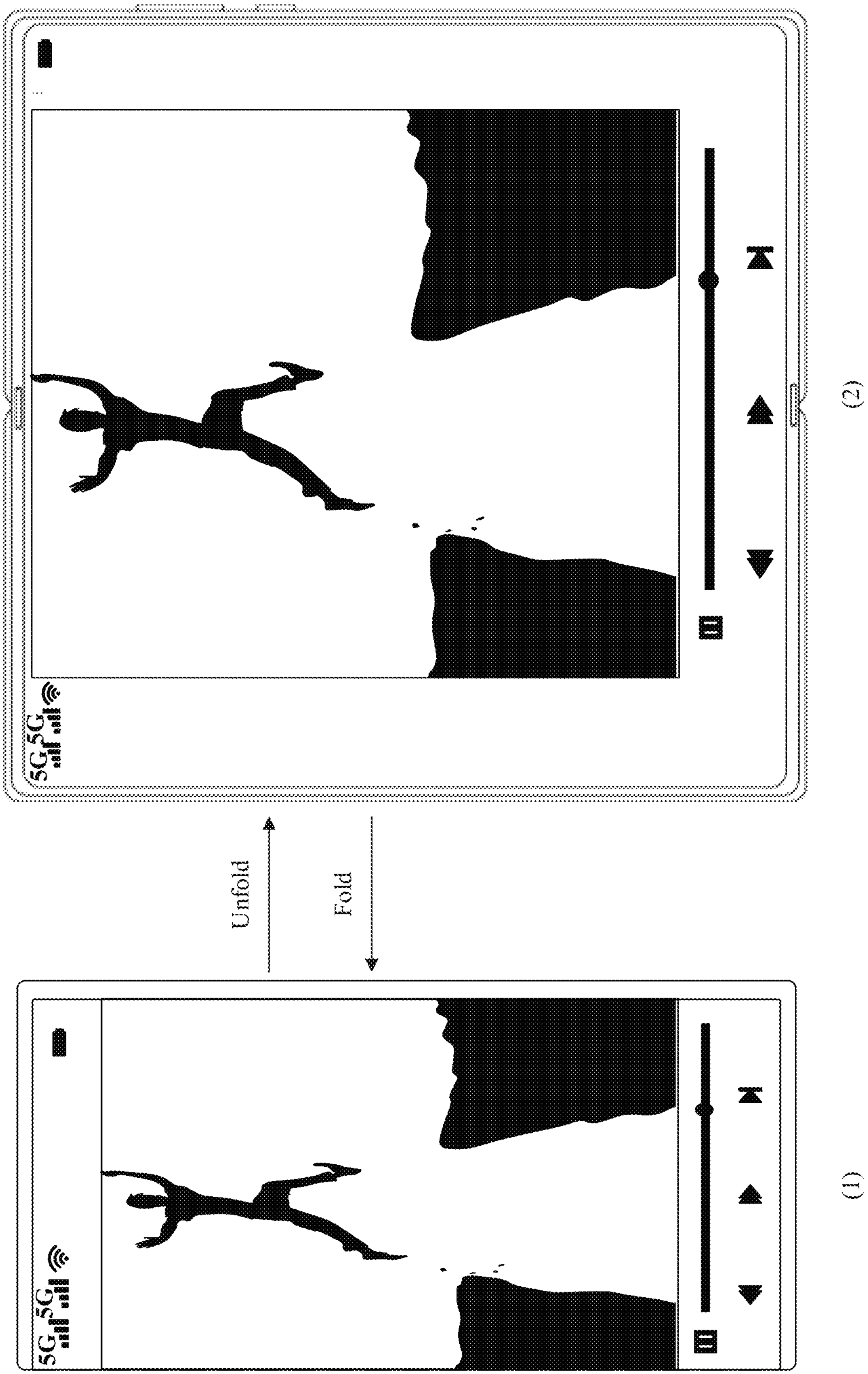
FIG. 1*b* is a schematic diagram of a video interface change in a process in which a foldable phone is unfolded and folded during video playing according to an embodiment of this application.

To improve user experience of using foldable phones, many developers develop a series of functions associated with foldable screens. For example, a function of adaptively enlarging displayed content after unfolding and adaptively reducing displayed content after folding is designed. For example, as shown in FIG. 1*b*, when the foldable phone is unfolded from (1) in FIG. 1*b* to (2), a video playing interface is adaptively enlarged, and a playing task continues. When the foldable phone is folded from (2) in FIG. 1*b* to (1), a video playing interface is adaptively reduced, and a playing task continues.

Specifically, there are many functions associated with the foldable screen. Details are not described in this application. In a process of performing a series of functions associated with the foldable screen, a hinge angle of the foldable phone usually needs to be obtained. For example, with unfolding or folding of the foldable phone, a display size of the video playing interface needs to be adjusted adaptively. Therefore, the foldable phone has a requirement for obtaining an accurate hinge angle.

Due to the requirement for obtaining an accurate hinge angle, embodiments of this application provide a hinge angle detection method. The hinge angle detection method provided in embodiments of this application may be applied to a foldable phone, and may be further applied to a foldable electronic device such as a tablet computer, a notebook computer, an ultra-mobile personal computer (Ultra-mobile Personal Computer, UMPC), a handheld computer, or a netbook. That is, in embodiments of this application, a hinge angle of any foldable electronic device may be calculated.

Figure 2A:
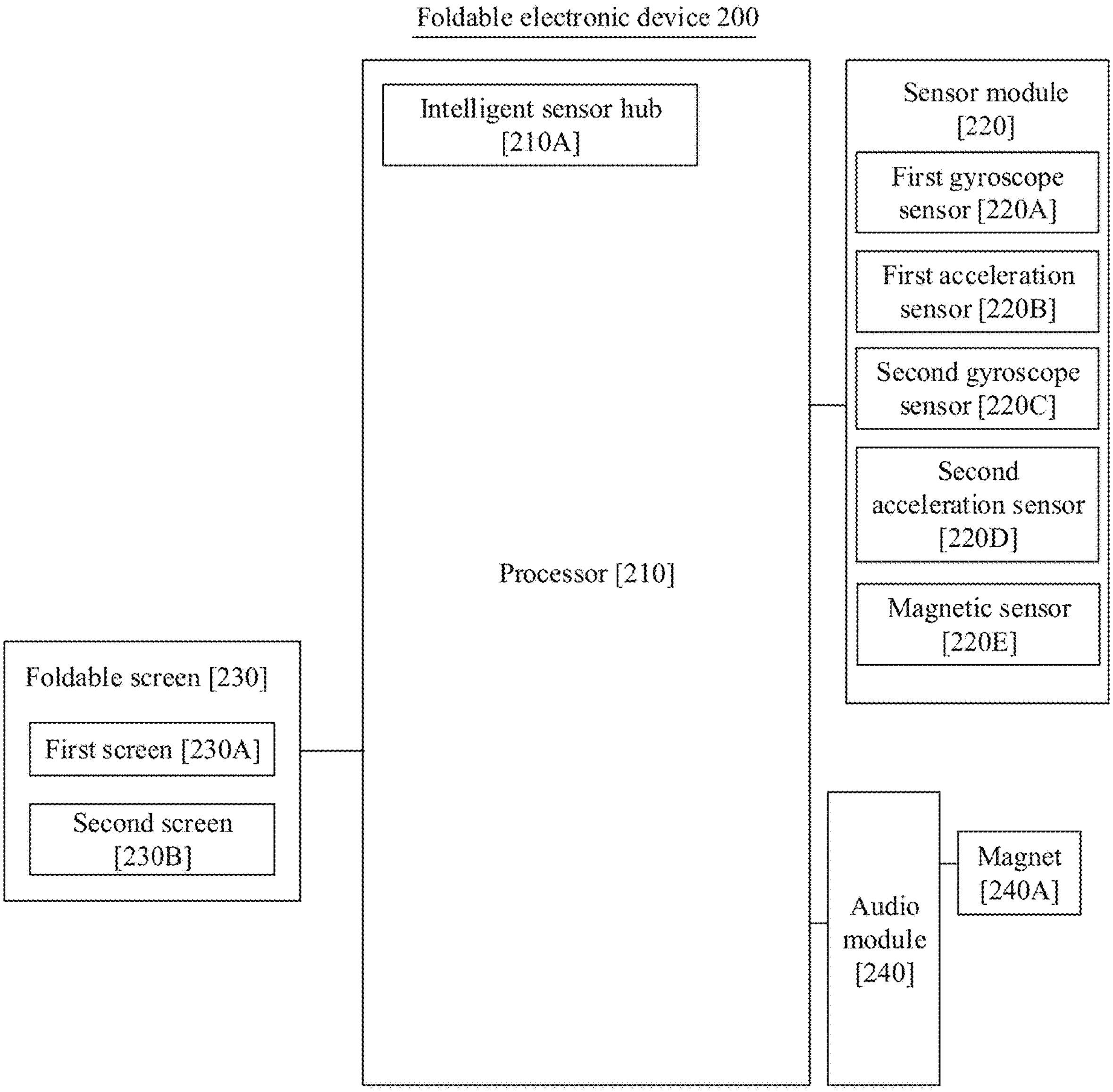
FIG. 2*a* is a schematic diagram of a hardware structure of a foldable electronic device according to an embodiment of this application.

As shown in FIG. 2*a*, a foldable electronic device 200 may include a processor 210, an intelligent sensor hub 210A, a sensor module 220, a first gyroscope sensor 220A, a first acceleration sensor 220B, a second gyroscope sensor 220C, a second acceleration sensor 220D, a magnetic sensor 220E, a foldable screen 230, an audio module 240, and a magnet 240A.

The first gyroscope sensor 220A, the first acceleration sensor 220B, and the magnetic sensor 220E may be disposed in the first body shown in FIG. 1*a*(1) to FIG. 1*a*(3), and the second gyroscope sensor 220C, the second acceleration sensor 220D, and the magnet 240A may be disposed in the second body shown in FIG. 1*a*(1) to FIG. 1*a*(3).

It may be understood that the structure shown in this embodiment does not constitute a specific limitation on the foldable electronic device. In some other embodiments, the foldable electronic device may include more or fewer components than those shown in the figure, or combine some components, or split some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit. NPU). Different processing units may be independent components, or may be integrated into one or more processors.

The processor 210 may further include the intelligent sensor hub (Sensor hub) 210A, configured to connect to and process data from various sensor devices. For example, in this embodiment of this application, the intelligent sensor hub 210A is connected to and processes data from the first gyroscope sensor 220A, the first acceleration sensor 220B, the second gyroscope sensor 220C, the second acceleration sensor 220D, and the magnetic sensor 220E, and performs, based on the data from the sensors, the following hinge angle detection method shown in FIG. 4*b*. For a specific execution process, refer to the following description of the hinge angle detection method shown in FIG. 4*b*. Details are not described herein.

The foldable screen 230 is configured to display an image, a video, and the like. The foldable screen 230 may be understood as a foldable flexible screen. The foldable screen 230 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diodes, QLED), or the like. The foldable screen 230 includes a first screen 230A and a second screen 230B. The foldable screen 230) may be unfolded or folded along a folding edge to form the first screen 230A and the second screen 230B. For related descriptions of the first screen 230A and the second screen 230B, refer to the first screen and the second screen in FIG. 1*a*(1) to FIG. 1*a*(3).

The first gyroscope sensor 220A may be configured to determine a motion posture of the electronic device. For example, angular velocities of the first screen around three axes of the first screen (that is, an x1-axis, a y1-axis, and a z1-axis) may be determined by using the first gyroscope sensor 220A. In this embodiment of this application, the first gyroscope sensor 220A may be configured to determine an angular velocity of the first screen around a y1-axis (that is, a common axis of the foldable screen) of a first-screen coordinate system. The first gyroscope sensor 220A may also be used for image stabilization during photographing.

The second gyroscope sensor 220C may also be configured to determine a motion posture of the electronic device. In this embodiment of this application, angular velocities of the second screen around three axes of the second screen (that is, an x2-axis, a y2-axis, and a z2-axis) may be determined by using the second gyroscope sensor 220C. In this embodiment of this application, the second gyroscope sensor 220C may be configured to determine an angular velocity of the second screen around the y2-axis (that is, a common axis of the foldable screen, where the y1-axis and the y2-axis are a same axis) of the second screen. The second gyroscope sensor 220C may also be used for image stabilization during photographing.

The first acceleration sensor 220B may detect a value of acceleration of the first screen in each direction (usually on three axes x1, y1, and z1 determined by the first screen). When the electronic device is static, magnitude and a direction of gravity may be detected. The first acceleration sensor 220B may be further configured to recognize a posture of the electronic device, and is applied to an application such as switching between landscape mode and vertical mode or a pedometer.

The second acceleration sensor 220D may detect a value of acceleration of the second screen in each direction (usually on three axes x2, y2, and z2 determined by the second screen). When the electronic device is static, magnitude and a direction of gravity may be detected. The second acceleration sensor 220D may be further configured to recognize a posture of the electronic device, and is applied to an application such as switching between landscape mode and vertical mode or a pedometer.

The magnetic sensor 220E is configured to detect magnetic field strength of the magnet 240A to obtain magnetic force data, and detect unfolding or closing of the foldable screen by using the magnetic force data. In this embodiment of this application, the magnetic sensor 220E is disposed in a body corresponding to the first screen (the first body). The intelligent sensor hub 210A determines, based on the magnetic force data obtained by the magnetic sensor 220E under an action of a magnetic field of the magnet 240A, whether the foldable screen is in an unfolded state or a closed state. Further, whether to enable hinge angle detection is determined based on a detected open/closed state. For details, refer to related parts of step S401 to step S403 in the hinge angle detection method shown in FIG. 4*b*.

The magnet 240A is configured to generate a magnetic field. In this embodiment of this application, the magnet 240A is disposed in a body corresponding to the second screen (the second body). In some embodiments, because a speaker has a magnet, the magnet 240A may be a speaker. The speaker is also referred to as a "horn", and is configured to convert an audio electrical signal into a sound signal. The electronic device may be used to listen to music or answer a call in a hands-free mode over the speaker. The magnet 240A may enable the magnetic sensor 220E to detect a magnetic force. With a change of an open/closed state of the foldable screen, a distance between the magnetic sensor 220E and the magnet 240A changes correspondingly, magnetic field strength of the magnet 240A detected by the magnetic sensor 220E also changes, and magnetic force data collected by the magnetic sensor 220E also changes accordingly. Therefore, the intelligent sensor hub 210A may detect the open/closed state of the foldable screen by using the magnetic force data detected by the magnetic sensor 220E.

Figure 2B:
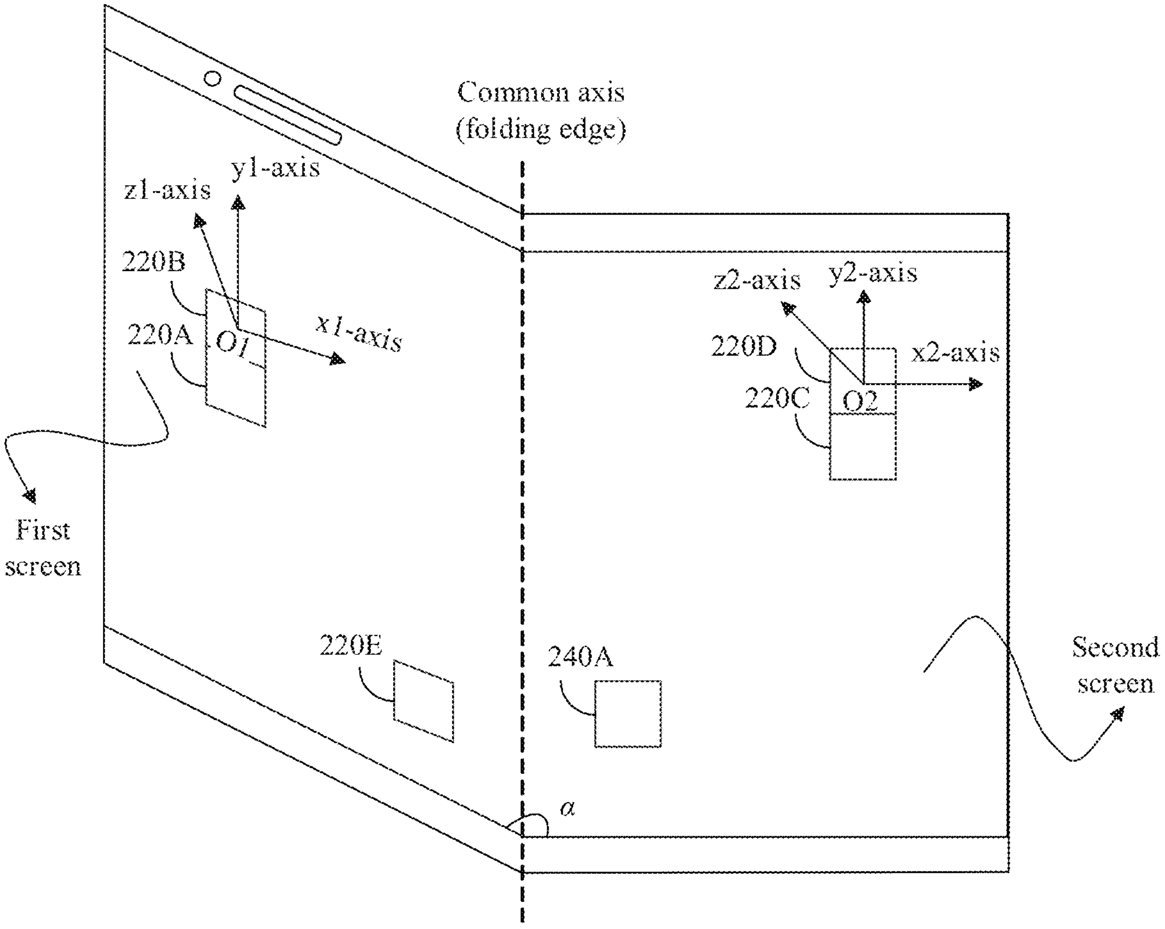
FIG. 2*b* is a schematic diagram of a hardware layout of a foldable phone according to an embodiment of this application.

For example, in some embodiments, if the foldable device shown in FIG. 2*a* is a foldable phone, a hardware layout inside the foldable phone may be shown in FIG. 2*b*. The first gyroscope sensor 220A, the first acceleration sensor 220B, and the magnetic sensor 220E are disposed in the first body, and the second gyroscope sensor 220C, the second acceleration sensor 220D, and the magnet 240A are disposed in the second body. The first gyroscope sensor 220A and the second gyroscope sensor 220C are disposed in parallel, and the first acceleration sensor 220B and the second acceleration sensor 220D are disposed in parallel, so that the y1-axis in the first-screen coordinate system can be parallel to the y2-axis in the second-screen coordinate system. A distance between the magnet 240A and the magnetic sensor 220E may be set to 2 cm, and is specifically determined according to a requirement for precision in an application scenario. Because the magnetic sensor 220E is easily interfered with by an external magnetic field, the magnetic sensor 220E may not be placed at an edge position on the first screen.

In addition, an operating system runs on the foregoing components, for example, an iOS operating system, an Android open-source operating system, or a Windows operating system. An application may be installed and run on the operating system.

The operating system of the foldable electronic device 200 may use a layered architecture, an event-driven architecture, a microkernel architecture, a micro-service architecture, or a cloud architecture. In embodiments of this application, an Android system with a layered architecture is used as an example to describe a software structure of the foldable electronic device.

Figure 3:
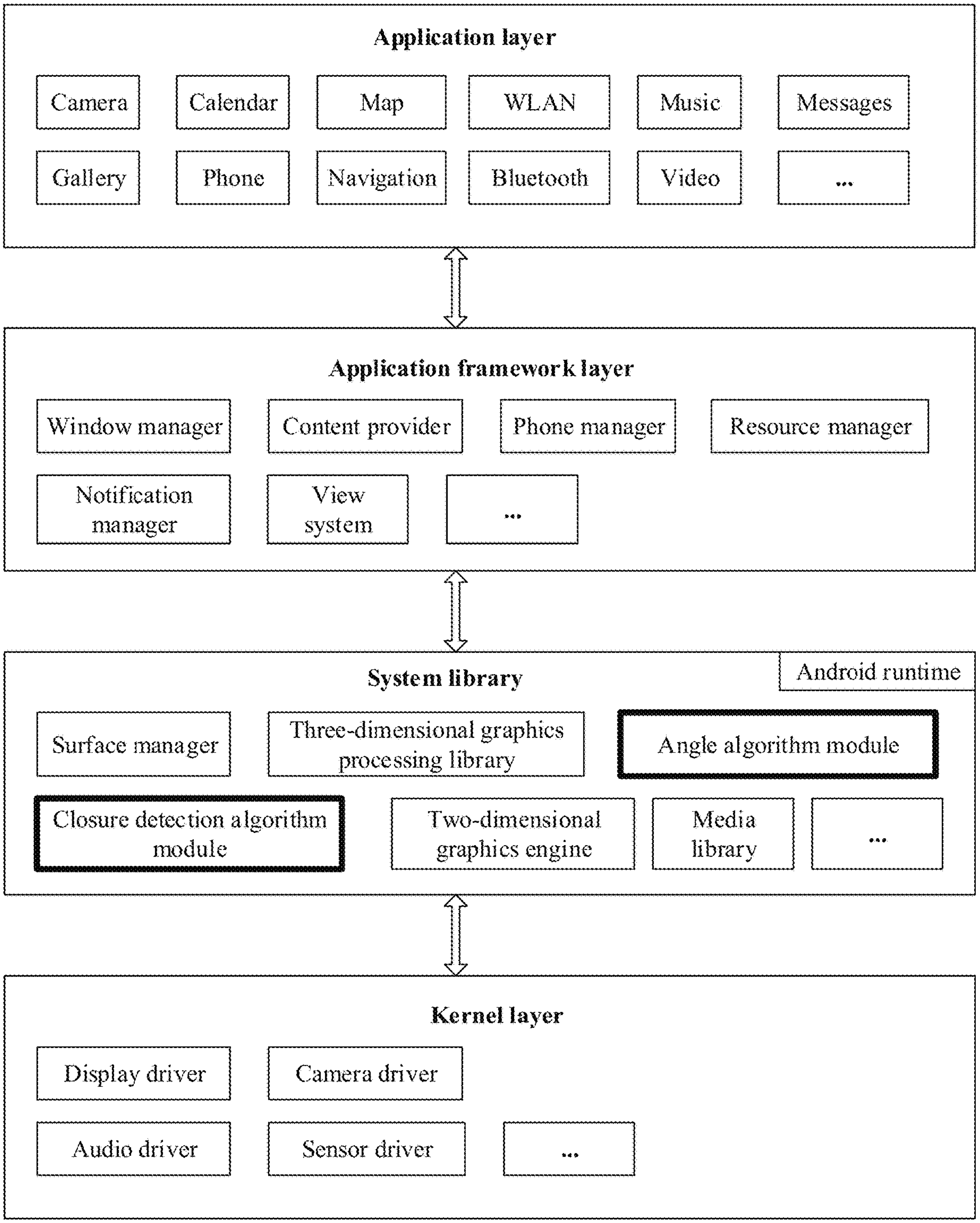
FIG. 3 is a schematic diagram of a software framework of a foldable electronic device according to an embodiment of this application.

FIG. 3 is a block diagram of a software structure of a foldable electronic device according to an embodiment of this application.

The layered architecture divides software into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages. As shown in FIG. 3, the application packages may include applications such as Camera, Gallery, Calendar, Phone, Map, Navigation, WLAN, Bluetooth, Music, Video, and Messages.

The application framework layer provides an application programming interface (application programming interface, API) and a programming framework for applications at the application layer. The application framework layer includes some predefined functions. As shown in FIG. 3, the application framework layer may include a window manager, a content provider, a view system, a phone manager, a resource manager, a notification manager, and the like.

The window manager is configured to manage window programs. The window manager may obtain a display size, determine whether there is a status bar, lock a screen, take a screenshot, and the like.

The content provider is configured to store and obtain data and make the data accessible to the application. The data may include videos, images, audio, calls that are made and received, browsing history and bookmarks, a phone book, and the like.

The view system includes visual controls, such as a text display control and a picture display control. The view system may be configured to construct an application. A display interface may include one or more views. For example, a display interface including an SMS notification icon may include a text display view and a picture display view:

The phone manager is configured to provide a communication function of the electronic device, for example, call status management (including accepting and declining).

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen.

The Android runtime includes a core library and a virtual machine. The Android runtime is responsible for scheduling and management of the Android system.

The core library includes two parts: a function that needs to be invoked by using the Java language, and a core library of Android.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

The system library may include a plurality of function modules, for example, a surface manager (surface manager), a media library (Media Libraries), a three-dimensional graphics processing library (for example, OpenGL ES), a 2D graphics engine (for example, SGL), an angle algorithm module, and a closure detection algorithm module. In this embodiment of this application, the angle algorithm module and the closure detection algorithm module are configured to cooperate with each other to perform the hinge angle detection algorithm shown in FIG. 4*b*. For details, refer to related content of the hinge angle detection algorithm shown in FIG. 4*b*.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It should be noted that although the Android system is used as an example for description in this embodiment of this application, a basic principle is also applicable to an electronic device based on an operating system such as iOS or Windows.

For ease of understanding, related technical principles in embodiments of this application are described herein.

(1) First-screen coordinate system and second-screen coordinate system: As shown in FIG. 2*b*, the x1-axis and the y1-axis in the first-screen coordinate system x1y1z1 are respectively parallel to or overlapped with the length and the width of the first screen, and the z1-axis is perpendicular to a plane on which the first screen is located. Other than a position shown in FIG. 2*b*, an origin o1 selected in the first-screen coordinate system may alternatively be in another position on the first screen. A manner of establishing the second-screen coordinate system x2y2z2 is similar to a manner of establishing the first-screen coordinate system, and details are not described herein. When origins selected in the first-screen coordinate system and the second-screen coordinate system overlap, the y1-axis and the y2-axis also overlap, and are a virtual axis on which the folding edge of foldable electronic device is located (that is, a common axis of foldable electronic device).

(2) An algorithm of calculating a hinge angle by using an acceleration sensor is briefly referred to as an acceleration sensor (Acceleration sensor, ACC) algorithm. The ACC algorithm calculates a hinge angle by using acceleration data collected by an acceleration sensor. The acceleration data may be specifically coordinates of an acceleration vector.

Figure 4A:
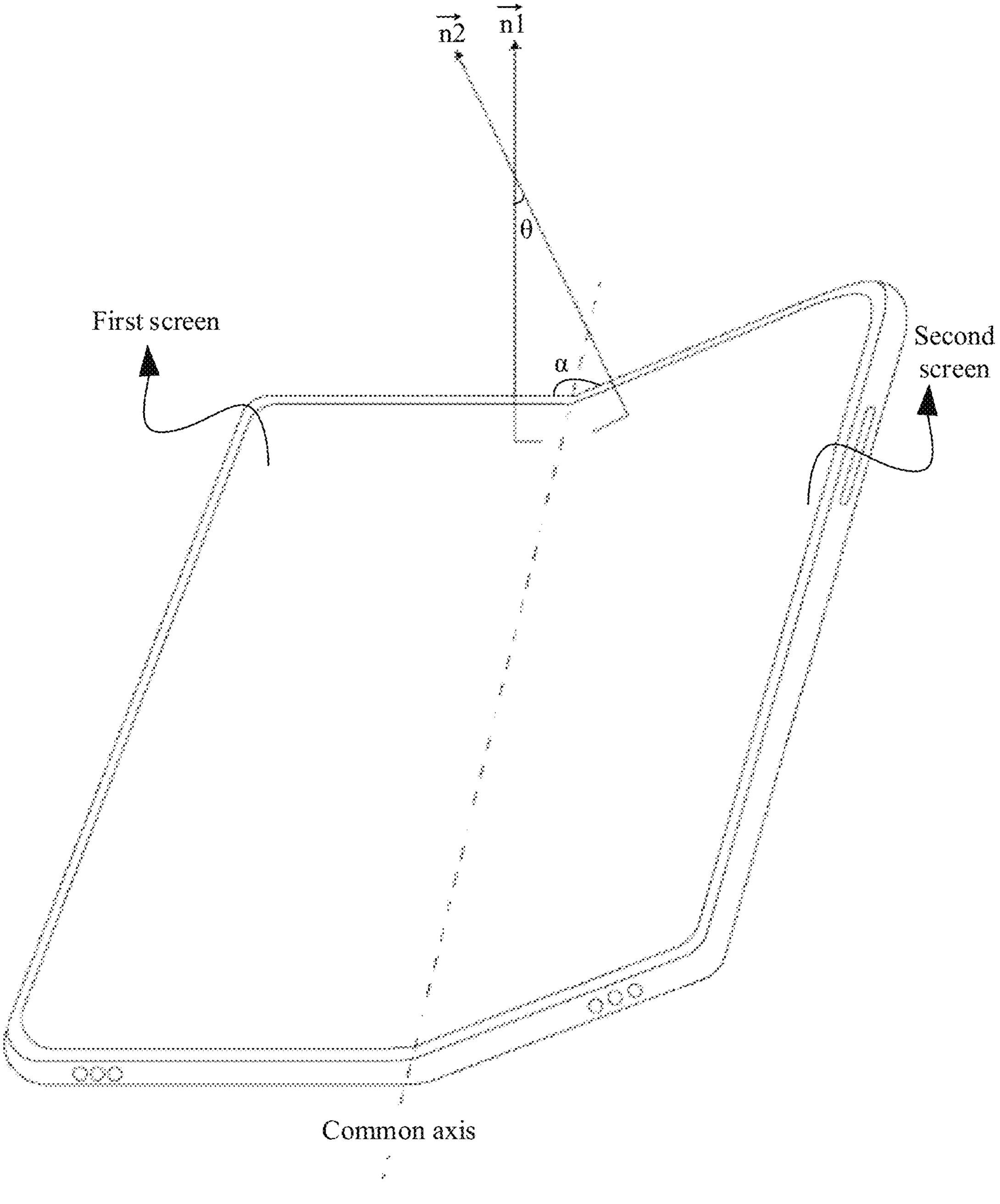
FIG. 4*a* is a schematic diagram of an included angle between two planes according to an embodiment of this application.

Specifically, a principle of calculating a hinge angle by using the ACC algorithm is as follows: As shown in FIG. 4*a*, calculating a hinge angle $\alpha$ of the foldable electronic device may be converted into calculating an included angle $\theta$ between a normal vector $\overrightarrow{n1}$ on the plane on which the first screen is located and a normal vector $\overrightarrow{n2}$ on the plane on which the second screen is located.

In a still state, the foldable electronic device is subject to only gravity. A gravity vector is equivalent to a Z-axis of an earth coordinate system, and coordinates of the gravity vector in a mobile phone coordinate system (that is, the first-screen coordinate system or the second-screen coordinate system) are equivalent to relative coordinates of the earth coordinate system relative to the mobile phone coordinate system. Therefore, a problem of calculating a hinge angle between the first screen and the second screen may be converted into calculating an included angle between a gravity vector (that is, a gravitational acceleration vector) in the first-screen coordinate system and a gravity vector (that is, a gravitational acceleration vector) in the second-screen coordinate system.

Specifically, in a still state, an acceleration vector (that is, a gravitational acceleration vector) in the first-screen coordinate system x1y1z1 collected by a first acceleration sensor is ($A_1$, $B_1$, $C_1$), and an acceleration vector in the second-screen coordinate system x2y2z2 collected by a second acceleration sensor is ($A_2$, $B_2$, $C_2$). Therefore, $A_1$, $B_1$, $C_1$, $A_2$, $B_2$, and $C_2$ are substituted into a formula 1 to calculate the included angle θ between the normal vector $\overrightarrow{n1}$ on the first screen and the normal vector $\overrightarrow{n2}$ on the second screen. For a working principle of the first acceleration sensor, refer to the description of the first acceleration sensor 220B in FIG. 2*a*. For a working principle of the second acceleration sensor, refer to the description of the second acceleration sensor 220D in FIG. 2*a*.

The formula 1 is $$\cos\theta = \frac{A_1A_2 + B_1B_2 + C_1C_2}{\sqrt{A_1^2 + B_1^2 + C_1^2} \cdot \sqrt{A_2^2 + B_2^2 + C_2^2}}.$$

The hinge angle α is equal to 180−θ.

In addition, because the y-axis of the first-screen coordinate system and the y-axis of the second-screen coordinate system are parallel, the formula 1 may be converted into a formula 2, that is, a projection vector ($A_1$, $C_1$) that is of the acceleration vector collected by the first acceleration sensor and that is on an x1o1z1 plane of the first-screen coordinate system and a projection vector ($A_2$, $C_2$) that is of the acceleration vector collected by the second acceleration sensor and that is on an x2o2z2 plane of the second-screen coordinate system are substituted into the formula 2, to obtain the hinge angle through calculation.

The formula 2 is $$\cos\theta = \frac{A_1A_2 + C_1C_2}{\sqrt{A_1^2 + C_1^2} \cdot \sqrt{A_2^2 + C_2^2}}.$$

The hinge angle α is equal to 180−θ.

The ACC algorithm may be in another specific algorithm form other than the formula 1 and the formula 2. This is not limited herein.

(3) An algorithm of calculating a hinge angle by using a gyroscope sensor is briefly referred to as a gyroscope sensor (Gyro) algorithm. The Gyro algorithm is an algorithm for calculating a hinge angle by using an angular velocity collected by a gyroscope sensor. Specifically, it can be learned from FIG. 2*b* that the y-axis of the first-screen coordinate system and the y-axis of the second-screen coordinate system are parallel or overlapped (that is, an axis on which a folding edge is located), and rotation along only the y-axis affects a value of the hinge angle. Therefore, when the angular velocity is used to calculate the hinge angle, a component of only the y-axis may be integrated.

Specifically, for each sampling cycle, an angular velocity Gyroy1 of rotating around the y1-axis that is collected by a first gyroscope sensor in the sampling cycle, an angular velocity Gyroy2 of rotating around the y2-axis that is collected by a second gyroscope sensor in the sampling cycle, and a hinge angle α calculated in a previous sampling cycle are substituted into a formula 3 to obtain a current hinge angle α through calculation. For a working principle of the first gyroscope sensor, refer to the description of the first gyroscope sensor 220A in FIG. 2*a*. For a working principle of the second gyroscope sensor, refer to the description of the second gyroscope sensor 220C in FIG. 2*a*.

The formula 3 is α=a+(Gyroy2−Gyroy1)×delatT. Herein, delatT is a value of the sampling cycle.

The Gyro algorithm may be in another specific algorithm form other than the formula 3. This is not limited herein.

(4) A fusion algorithm for calculating a hinge angle by using an acceleration sensor and a gyroscope sensor is briefly referred to as an acceleration sensor and gyroscope sensor fusion algorithm, that is, an A+G fusion algorithm, and may further be briefly referred to as a fusion algorithm in embodiments of this application. The A+G fusion algorithm is an algorithm for calculating a hinge angle by using angular velocity data collected by a gyroscope sensor and acceleration data collected by an acceleration sensor. There are many A+G fusion algorithms that may be used to fuse angular velocity data and acceleration data. For example, Kalman filtering may be used to fuse acceleration data and angular velocity data to calculate a hinge angle. In embodiments of this application, a specific form of an algorithm for calculating a hinge angle by fusing an angular velocity and an acceleration is not limited.

An A+G fusion algorithm model constructed based on Kalman filtering is as follows:

An estimation calculation process is:

$$eAngle = eAngle + delatT \times Gyro; \text{ and}$$

$$P = P + Q.$$

A measurement calculation process is:

$$K = P/(P + R);$$

$$eAngle = eAngle + K \times (Angle - eAngle); \text{ and}$$

$$P = (1 - K) \times P.$$

Herein, Gyro=Gyroy2−Gyroy1. Gyroy1 is an angular velocity of rotating around the y1-axis that is collected by the first gyroscope sensor in a sampling cycle, and Gyroy2 is an angular velocity of rotating around the y2-axis that is collected by the second gyroscope sensor in the sampling cycle. delatT is a value of the sampling cycle. eAngle is a hinge angle estimated by the hinge angle algorithm model, and eAngle initially input into the model may be assumed randomly, or a hinge angle calculated last time is used as eAngle. P is a prior estimation covariance, and P initially input into the model may be a non-0 number between 0 and 1. Specifically, P may be set randomly. Q is a process covariance, is equivalent to a system error inside the A+G fusion algorithm model constructed based on Kalman filtering, and is a fixed value that is preset according to experience, for example, may be 0.000001. R is a key parameter measurement error, is equivalent to an error that exists in the algorithm for calculating a hinge angle by using an acceleration sensor, and is also a fixed value that is preset according to experience, for example, may be 1.5. K is a covariance, is a parameter generated during internal operation of the model, and does not need to be input to the model from the outside. Angle is a value of a hinge angle calculated according to the algorithm for calculating a hinge angle by using an acceleration sensor.

In the A+G fusion algorithm model constructed based on Kalman filtering, values of Q and R are preset. It is assumed that random eAngle and P are input into the model, and then new eAngle and P may be estimated by using a formula of an estimation calculation process. Then, eAngle and P may be updated by using a formula in a measurement calculation process. Then, eAngle and P that are updated in the measurement calculation process are iterated to the formula in the estimation calculation process, and a relatively accurate hinge angle eAngle may be output after a plurality of times of repeated iteration.

In the A+G fusion algorithm model constructed based on Kalman filtering, the algorithm for calculating a hinge angle by using a gyroscope sensor is mainly used, and data of a hinge angle calculated by using the ACC algorithm is fused. Although an error of the hinge angle calculated by using the ACC algorithm is relatively large when the foldable electronic device moves, a size change trend can compensate for an error of the Gyro algorithm. The A+G fusion algorithm model constructed based on Kalman filtering has advantages of simple calculation, high efficiency, and fast convergence, can filter out high-frequency and low-frequency interference, and can be independent of an accurate initial hinge angle.

Figure 4B:
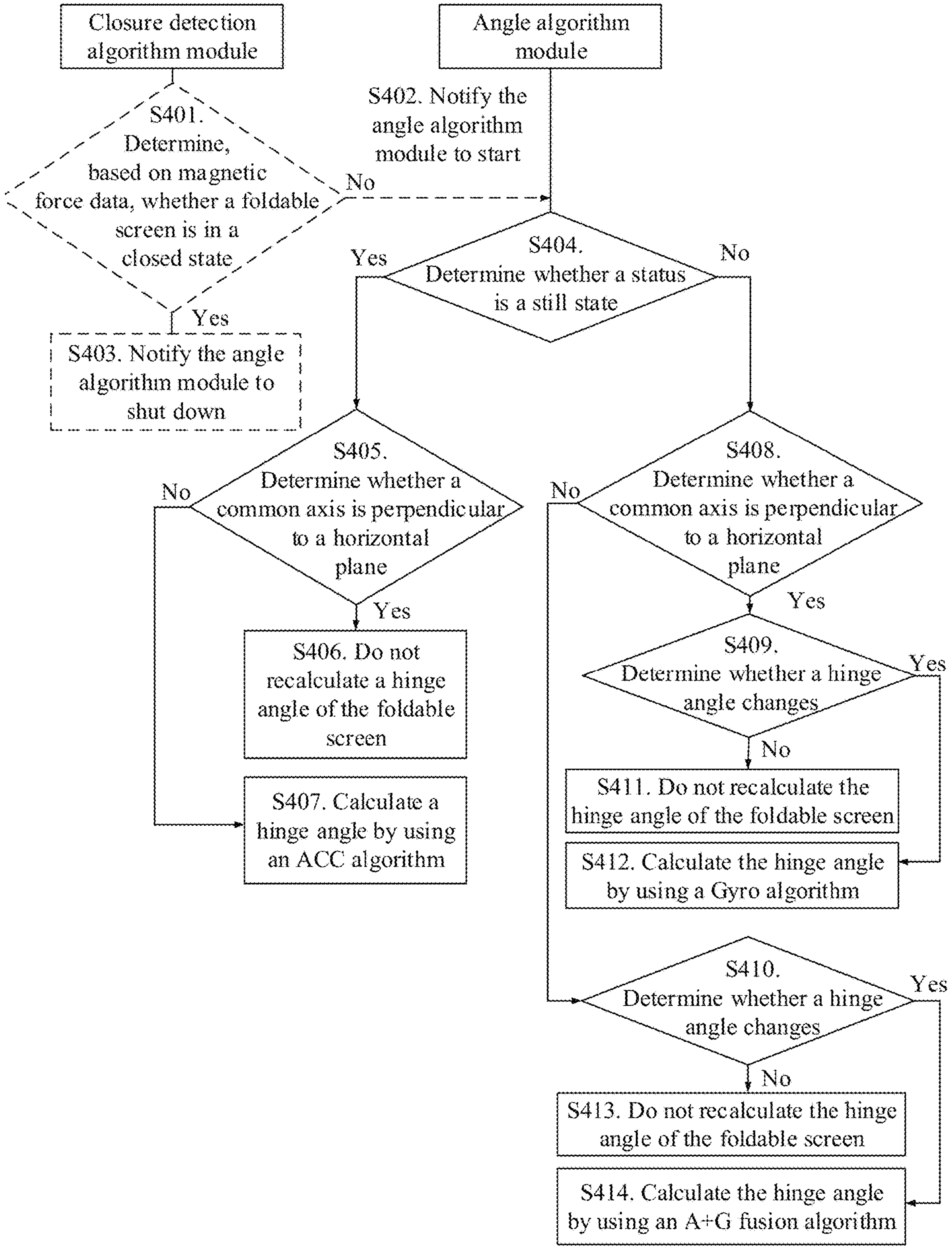
FIG. 4*b* is a schematic flowchart of a hinge angle detection method according to an embodiment of this application.

With reference to FIG. 4*b*, the following describes a hinge angle detection method according to an embodiment of this application.

FIG. 4*b* is a hinge angle detection method according to an embodiment of this application. The method is applied to a foldable electronic device according to an embodiment of this application. A foldable phone is used as an example to describe the following steps.

S401. A closure detection algorithm module determines, based on magnetic force data, whether a foldable screen is in a closed state.

The magnetic force data is collected by using a magnetic sensor in the electronic device, and there is a correspondence between magnetic force data and a hinge angle of a foldable screen. A corresponding hinge angle may be determined by using the magnetic force data collected by the magnetic sensor, and then whether the foldable screen is in a closed stat is determined according to the hinge angle.

The closed state is a state in which the hinge angle of the foldable screen is close to 0, and a non-closed state is a state in which the hinge angle is greater than 0, or may be considered as an open state of the foldable screen. As shown in FIG. 1*a*(1) to FIG. 1*a*(3), when the foldable screen is completely unfolded as shown in FIG. 1*a*(1), an unfolded state of the foldable screen is formed, that is, the foldable screen is not in a closed state. After the foldable screen is folded in a folding direction shown in FIG. 1*a*(1), as shown in FIG. 1*a*(2), when a folding angle α of the foldable screen is greater than 0, and the foldable screen forms a stand state, the foldable screen is also in an open state, that is, the foldable screen is not in a closed state. As shown in FIG. 1*a*(3), when the hinge angle α is almost 0, a first screen overlaps a second screen, and in this case, the foldable screen is in a closed state (or referred to as a folded state).

In some embodiments, the magnetic force data may be a norm of a magnetic vector. The closure detection algorithm module determines a current hinge angle by using a correspondence between a norm of a magnetic vector and a hinge angle, and may further determine, according to the determined hinge angle, whether the foldable screen is in the closed state.

Figure 5:
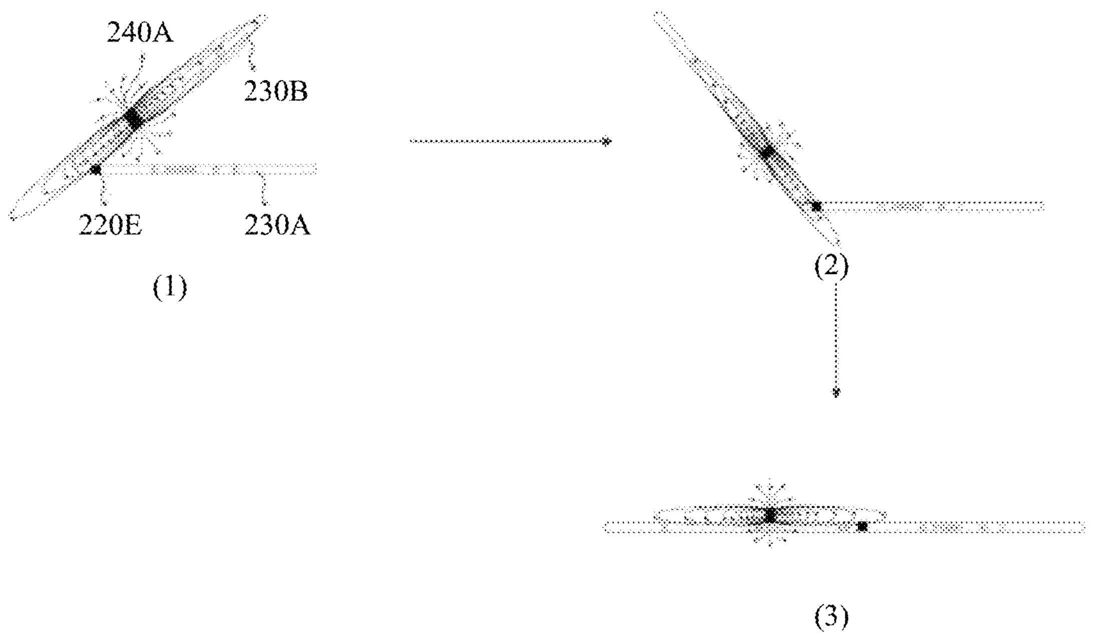
FIG. 5 is a schematic diagram of a magnetic force change detected by a magnetic sensor in an unfolding process according to an embodiment of this application.

In some embodiments, the norm of the magnetic vector is negatively correlated with the hinge angle. Specifically, as shown in FIG. 5, when the foldable screen 230 of the electronic device in FIG. 2*a* is folded into the first screen 230A and the second screen 230B, a magnetic induction line emitted by a magnet inside the magnet 240A passes through the magnetic sensor 220E, so that the magnetic sensor 220E collects the norm of the magnetic vector. When the foldable phone is unfolded in an order of (1), (2), and (3), the hinge angle between the first screen 230A and the second screen 230B gradually increases. It can be learned from (1), (2), and (3) in FIG. 5 that as the hinge angle increases, a quantity of magnetic induction lines passing through the magnetic sensor 220E decreases, and the norm of the magnetic vector detected by the magnetic sensor 220E decreases.

Figure 6:
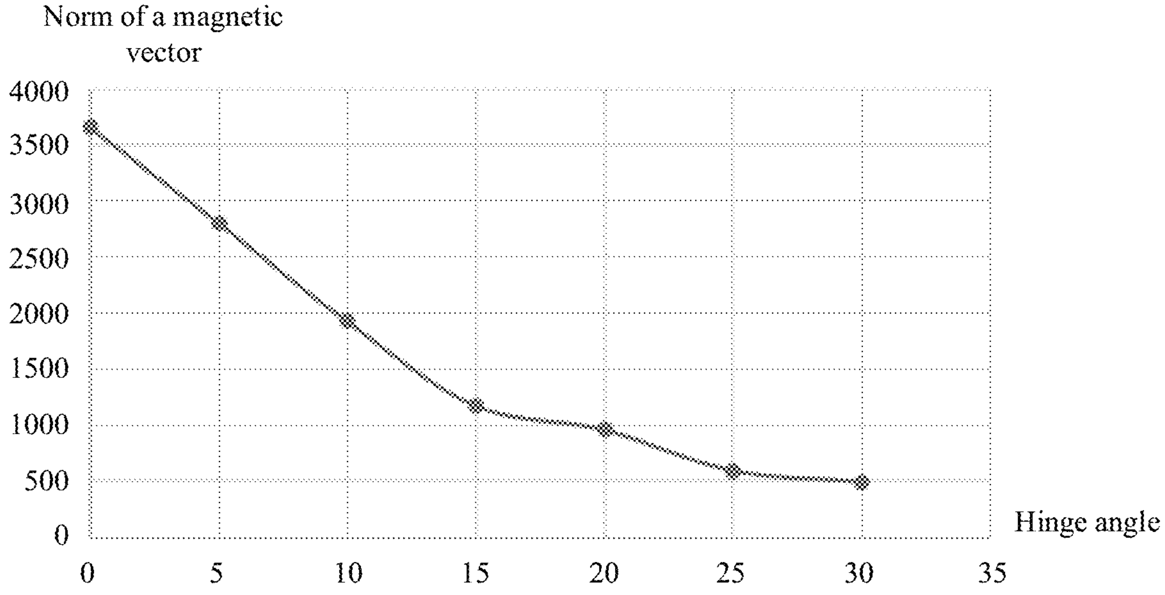
FIG. 6 is a schematic diagram of a relationship between a norm of a magnetic vector and a hinge angle according to an embodiment of this application.

In some embodiments, when the determined hinge angle is greater than or equal to a first preset angle value, that is, when the norm of the magnetic vector is less than or equal to a first preset magnetic force value, it is determined that the foldable screen is not in the closed state (that is, is in the open state). For example, as shown in FIG. 6, the second preset angle may be set to 10 degrees, and a corresponding second preset magnetic force value is 1930. That is, when the norm of the magnetic vector is less than or equal to 1930, it indicates that the hinge angle is greater than or equal to 10 degrees, and it is determined that the foldable screen is not in the closed state.

In some embodiments, when the determined hinge angle is less than or equal to a second preset angle value, that is, when the norm of the magnetic vector is greater than or equal to a second preset magnetic force value, it is determined that the foldable screen is in the closed state. For example, as shown in FIG. 6, the first preset angle value may be set to 5 degrees, and the corresponding first preset magnetic force value is 2800. That is, when the norm of the magnetic vector is greater than or equal to 2800, it indicates that the hinge angle is less than or equal to 5 degrees, and it is determined that the foldable screen is in the closed state. The first preset angle value and the second preset angle value may be equal or not equal. Further, the first preset magnetic force value and the second preset magnetic force value may be equal or not equal.

If it is determined in step S401 that the foldable screen is not in the closed state, an angle algorithm module needs to start to detect the hinge angle of the foldable screen. Therefore, step S402 needs to be performed. If it is determined in step S401 that the foldable screen is in the closed state, it indicates that no hinge angle of the foldable screen needs to be detected. Therefore, step S403 needs to be performed.

It should be noted that step S401 is a step performed in real time or periodically. Step S402 or S403 may be performed each time whether the foldable screen is in a closed state is determined in step S401. Alternatively, step S402 or S403 may be performed only when it is determined that the status of the foldable screen changes (for example, changes from a closed state to a non-closed state).

S402. The closure detection algorithm module notifies the angle algorithm module to start.

That the angle algorithm module starts means that the angle algorithm module starts to detect the hinge angle of the foldable screen. When the foldable screen is not in the closed state (that is, is in the open state), it indicates that the foldable screen needs to be unfolded to implement some functions (for example, a function displayed in the scenario shown in FIG. 1*a*(1) to FIG. 1*a*(3) and FIG. 1*b*). For these functions, a current posture of the foldable screen needs to be detected, that is, a hinge angle of the foldable screen needs to be known. Therefore, the angle algorithm module needs to start to detect the hinge angle.

In some embodiments, there are many manners in which the closure detection algorithm module notifies the angle algorithm module to start. For example, the angle algorithm module may be notified in a manner of sending a start instruction. For another example, the angle algorithm module may be notified in a manner of sending a start request. A specific manner of notifying the angle algorithm module is not limited.

In response to the start notification of the closure detection algorithm module, the angle algorithm module starts to detect the hinge angle, and starts to perform step S404. In some embodiments, a preparation process for starting to detect the hinge angle may be: creating a thread for performing hinge angle detection, and controlling a sensor to be used in a process of starting hinge angle detection to start to work. For example, the first gyroscope sensor 220A, the first acceleration sensor 220B, the second gyroscope sensor 220C, and the second acceleration sensor 220D shown in FIG. 2*a* may be controlled to start to work.

S403. The closure detection algorithm module notifies the angle algorithm module to shut down.

That the angle algorithm module shuts down means that the angle algorithm module stops detecting the hinge angle of the foldable screen. When the foldable screen is in the closed state, it indicates that there is currently no need to perform any function that requires a hinge angle, and therefore, the angle algorithm module may be notified to shut down, to reduce power consumption and improve running efficiency.

In some embodiments, there are many manners in which the closure detection algorithm module notifies the angle algorithm module to shut down. For example, the angle algorithm module may be notified in a manner of sending a shutdown instruction. For another example, the angle algorithm module may be notified in a manner of sending a shutdown request. A specific manner of notifying the angle algorithm module is not limited.

In response to the shutdown notification of the closure detection algorithm module, the angle algorithm module stops detecting the hinge angle. In some embodiments, a process for stopping detecting the hinge angle may be: ending a thread for performing hinge angle detection, and controlling a sensor to be used in a process of starting hinge angle detection to stop working. In other words, the sensor stops collecting data. For example, the first gyroscope sensor 220A, the first acceleration sensor 220B, the second gyroscope sensor 220C, and the second acceleration sensor 220D shown in FIG. 2*a* may be controlled to stop working. When the foldable screen is in the closed state, the angle algorithm module does not work, and the sensor required in the hinge angle detection process does not work, so that hinge angle detection is stopped. Therefore, power consumption is reduced, and running efficiency is improved.

S404. The angle algorithm module determines whether the foldable phone is in a still state.

When starting to detect the hinge angle of the foldable phone, the angle algorithm module needs to first determine a current motion status of the foldable phone, to select an appropriate angle algorithm to calculate the hinge angle. The still state in this embodiment of this application may be understood as a relatively still state. In the still state, the foldable phone is equivalent to being subject to only gravity.

When the angle algorithm module determines that the foldable phone is in the still state, it indicates that the ACC algorithm with relatively high calculation precision in the still state may be suitable to be used to calculate the hinge angle. When the angle algorithm module determines that the foldable phone is not in the still state, it indicates that the ACC algorithm is not suitable to be used, and then a currently appropriate angle algorithm needs to be further determined.

In some embodiments, the angle algorithm module determines, by obtaining a norm of an acceleration vector of the foldable phone, whether the foldable phone is in the still state (that is, determines a motion status of the foldable phone). When the norm of the acceleration vector is close to 9.8 $m/s^2$, that is, close to the value of the gravitational acceleration, it is determined that the foldable phone is in the still state. Specifically, when a difference between the norm of the acceleration vector of the electronic device and the gravitational acceleration is less than or equal to a first preset value, it is considered that the norm of the acceleration vector is close to the gravitational acceleration, and it is determined that the motion status of the electronic device is the still state. When the difference between the norm of the acceleration vector and the gravitational acceleration is greater than the first preset value, it is considered that the norm of the acceleration vector is not close to the gravitational acceleration, and it is determined that the motion status of the electronic device is not the still state. The first preset value may be set according to actual experience, and the first preset value may be close to 0.

In some embodiments, an acceleration sensor may be used to obtain the norm of the acceleration vector of the foldable phone. For example, if the foldable phone is shown in FIG. 2*a*, the norm of the acceleration vector may be obtained by using the first acceleration sensor 220B or the second acceleration sensor 220D.

When the angle algorithm module determines that the foldable phone is in the still state, step S405 is performed. When the angle algorithm module determines that the foldable phone is not in the still state, step S408 is performed.

S405. The angle algorithm module determines whether a common axis is perpendicular to a horizontal plane.

As shown in FIG. 2*b*, the common axis is an axis on which a folding edge is located, and may also be understood as the y1-axis in the first-screen coordinate system x1y1z1 or the y2-axis in the second-screen coordinate system x2y2z2. The horizontal plane is a horizontal plane in an earth coordinate system.

After it is determined that the foldable phone is in the still state in step S404, it indicates that a currently appropriate algorithm used to calculate the hinge angle is the ACC algorithm. However, the ACC algorithm can accurately calculate the hinge angle only when the common axis is not perpendicular to the horizontal plane. Therefore, it needs to be further determined whether the common axis is perpendicular to the horizontal plane.

When the common axis is perpendicular to the horizontal plane, and it is further determined that the foldable phone is in the still state in step S404, step S406 is performed. When the common axis is not perpendicular to the horizontal plane, and it is further determined that the foldable phone is in the still state in step S404, step S407 is performed.

In some embodiments, step S405 may be performed in a manner of determining, based on a component of acceleration on the common axis, whether the common axis is perpendicular to the horizontal plane. Specifically, the component of the acceleration vector on the common axis is obtained by using the acceleration sensor, for example, the first acceleration sensor 220B or the second acceleration sensor 220D in FIG. 2*a*. If the component of the acceleration vector on the common axis (that is, a component on the y1-axis in the first-screen coordinate system or a component on the y2-axis in the second-screen coordinate system) is close to 9.8, it is determined that the common axis is perpendicular to the horizontal plane.

In some embodiments, if a difference between the component of the acceleration vector on the common axis and the gravitational acceleration is less than or equal to a first preset value, it is determined that the common axis is perpendicular to the horizontal plane. If the difference between the component of the acceleration vector on the common axis and the gravitational acceleration is greater than the first preset value, it is determined that the common axis is not perpendicular to the horizontal plane. The first preset value may be a number close to 0, and the value of the gravitational acceleration is 9.8. When the difference between the component of the acceleration vector on the common axis and the gravitational acceleration is less than or equal to the first preset value, it is considered that the component of the acceleration vector on the common axis is close to the gravitational acceleration 9.8, and it is determined that the common axis is perpendicular to the horizontal plane. Because it is determined in step S404 that the foldable screen is in the still state and is subject to only gravity, when all values of the gravitational acceleration are on the common axis, it indicates that a direction of gravity coincides with the common axis, and the common axis is perpendicular to the horizontal plane. On the contrary, when the difference between the component of the acceleration vector on the common axis and the gravitational acceleration is greater than the first preset value, it is considered that the component of the acceleration vector on the common axis is not close to the gravitational acceleration, and it is determined that the common axis is not perpendicular to the horizontal plane.

S406. The angle algorithm module does not recalculate a hinge angle of the foldable screen.

That the hinge angle of the foldable screen is not recalculated may also be understood as that a hinge angle of the foldable screen that is obtained through calculation in the previous time continues to be used as the currently detected hinge angle of the foldable screen, that is, a hinge angle detected last time (or the latest time) is used as the currently detected hinge angle.

It should be noted that, starting from step S402 of notifying the angle algorithm module to start, the angle algorithm module calculates a hinge angle of the foldable screen periodically or in real time until the angle algorithm module is notified to shut down. The flowchart shown in FIG. 4*b* is an example of a process of detecting a hinge angle. For a current process of detecting a hinge angle, when it is determined that the hinge angle does not need to be recalculated, the latest detected hinge angle is directly used as the currently detected hinge angle.

It is determined in step S404 that the foldable phone is currently in the still state. In the still state, a hinge angle calculated by using the ACC algorithm is more accurate than that calculated by using the Gyro algorithm. However, when it is determined in step S405 that the common axis is perpendicular to the horizontal plane, and the hinge angle is calculated by using the ACC algorithm, the hinge angle is calculated by using a projection of the acceleration vector on the x1o1z1 plane in the first-screen coordinate system and a projection of the acceleration vector on the x2o2z2 plane in the second-screen coordinate system. Therefore, when the common axis is perpendicular to the horizontal plane and the foldable phone is in the still state, it indicates that the foldable phone is affected by only the gravitational acceleration, and the gravitational acceleration vector coincides with the common axis. There is no projection on the xoz plane, and the hinge angle cannot be calculated by using the ACC algorithm. In addition, because the foldable electronic device is in the still state and is not affected by another external force, and the hinge angle does not change, the hinge angle may not be recalculated. For a technical principle of the ACC algorithm, refer to the foregoing description of the ACC algorithm. Details are not described herein again.

Figure 7A:
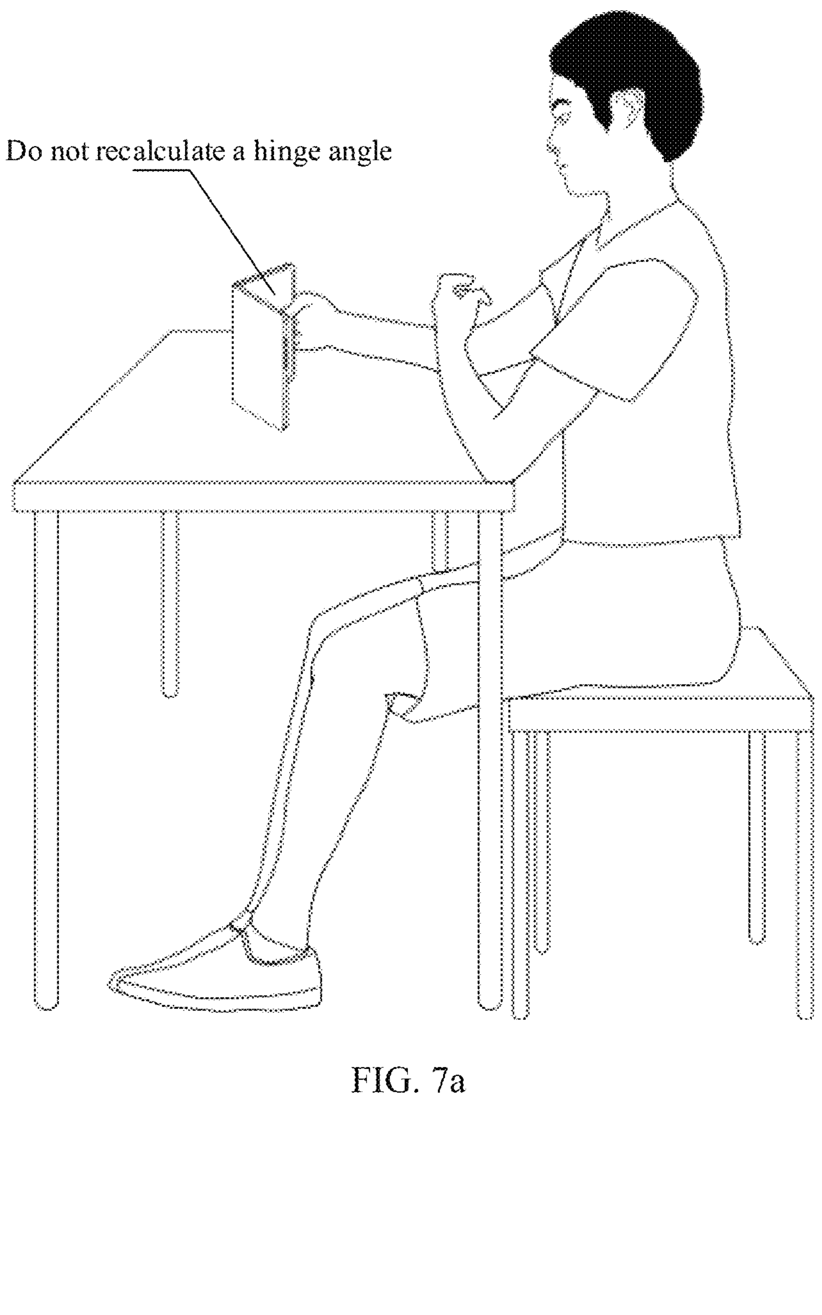
FIG. 7*a* is a diagram 1 of a scenario in which a foldable phone detects a hinge angle according to an embodiment of this application.

For example, as shown in FIG. 7*a*, when a user places the foldable phone on a table, and the folding edge is perpendicular to the horizontal plane, the foldable phone does not recalculate a hinge angle.

In some embodiments, after the hinge angle of the foldable screen is not recalculated, the hinge angle of the foldable screen that is calculated last time may be used as the currently detected hinge angle. If a current function of the foldable phone needs to use the hinge angle of the foldable screen, the hinge angle of the foldable screen that is calculated last time may be used.

Specifically, in some embodiments, if the angle algorithm module currently calculates (detects) a hinge angle for the first time, a hinge angle that is latest calculated by the closure detection algorithm module by using the norm of the magnetic vector may be used as the current hinge angle. Specifically, for a process in which the closure detection algorithm module calculates the hinge angle by using the norm of the magnetic vector, refer to related content in step S401, and details are not described herein again. In some other embodiments, if the angle algorithm module does not calculate a hinge angle for the first time currently, the hinge angle calculated by the angle algorithm module last time is directly used as the currently detected hinge angle.

It should be noted that, in the still state, a reason that the hinge angle calculated by using the acceleration is more accurate than the hinge angle calculated by using the Gyro algorithm is as follows: It can be learned from the foregoing description of the Gyro algorithm that in the Gyro algorithm, the current hinge angle needs to be calculated by using a hinge angle a calculated in a previous sampling cycle. Therefore, if only the Gyro algorithm is used to calculate the hinge angle, an initial hinge angle needs to be extremely accurate. In addition, an error of an angular velocity collected by the gyroscope sensor increases with time. Therefore, in a normal case, the hinge angle calculated by using the ACC algorithm is more accurate. Especially, in the still state, because there is only impact of the gravitational acceleration, accuracy of the hinge angle calculated by using the ACC algorithm is relatively high.

Figure 7B:
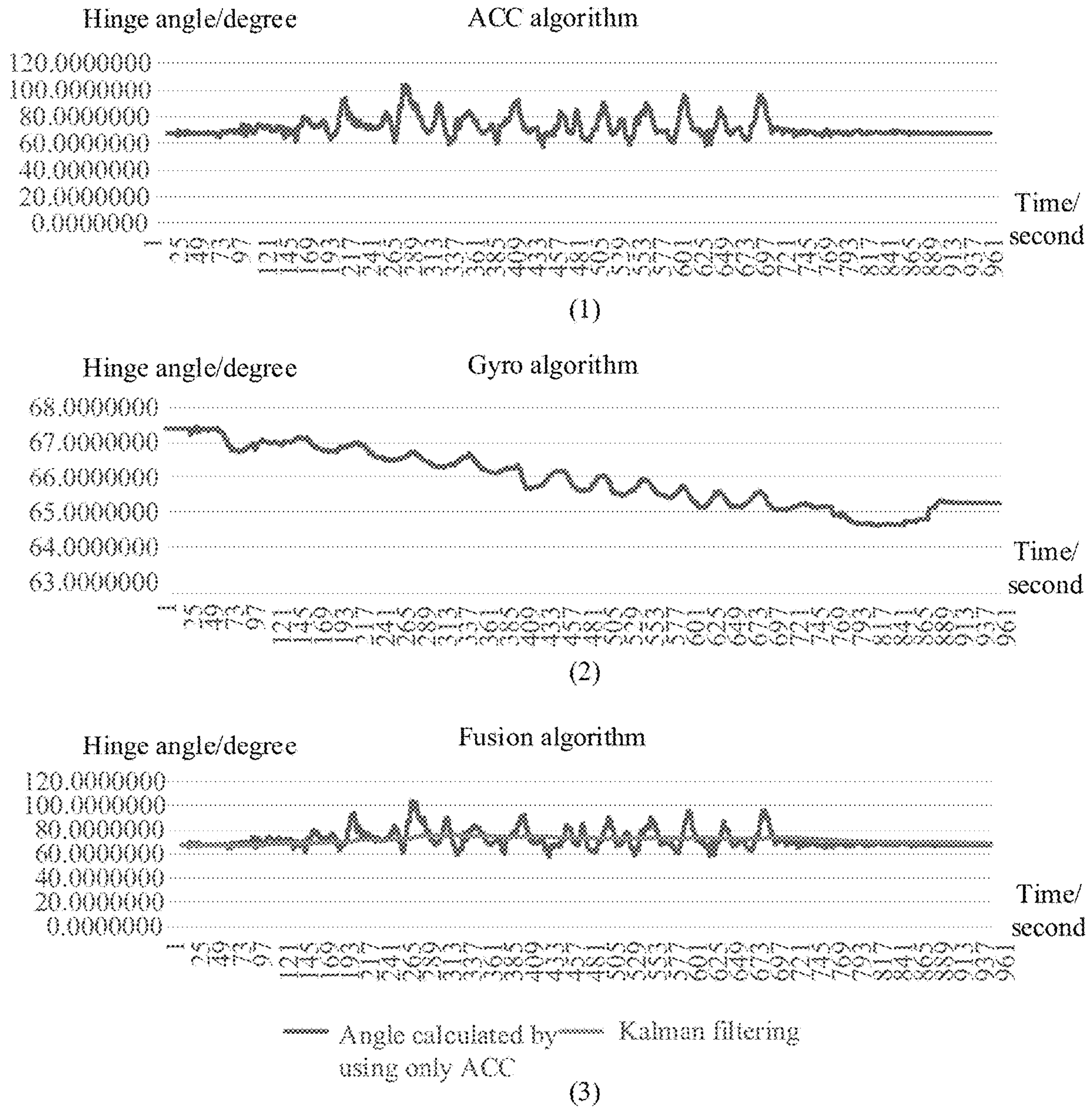
FIG. 7*b* is a schematic diagram of changes of hinge angles in different algorithms according to an embodiment of this application.

For example. FIG. 7*b* is a diagram of changes of hinge angles detected by using a plurality of algorithms. Specifically, a motion status of a foldable phone whose hinge angle is 67 degrees is changed from a still state to a shaking state, and finally returned to the still state. It can be learned from FIG. 7*b* that, compared with a hinge angle calculated by using the ACC algorithm in (1), an angle measured by using the Gyro algorithm in (2) gradually deviates from the real value 67 degrees as time increases. However, in the ACC algorithm, in a still period, that is, in a phase of seconds 0 to 73 and a phase of seconds 721 to 961, the value of the calculated hinge angle does not change, and is always 67 degrees. It can be learned that, in the still state, a hinge angle can be more accurately calculated by using the ACC algorithm compared with the Gyro algorithm.

S407. The angle algorithm module calculates a hinge angle by using the ACC algorithm.

In some embodiments, after it is determined that the foldable phone is in the still state, and the common axis is not perpendicular to the horizontal plane, it indicates that the hinge angle may be currently calculated by using the ACC algorithm. It can be learned from the foregoing related description in FIG. 7*b* that accuracy of calculating a hinge angle by using the ACC algorithm in the still state is relatively high, and the current common axis is not perpendicular to the horizontal plane. The first acceleration sensor may collect the projection of the acceleration vector on the x1o1z1 plane of the first-screen coordinate system, and the second acceleration sensor may collect the projection of the acceleration vector on the x2o2z2 plane of the second-screen coordinate system. Therefore, a condition of using the ACC algorithm is met.

Figure 7C:
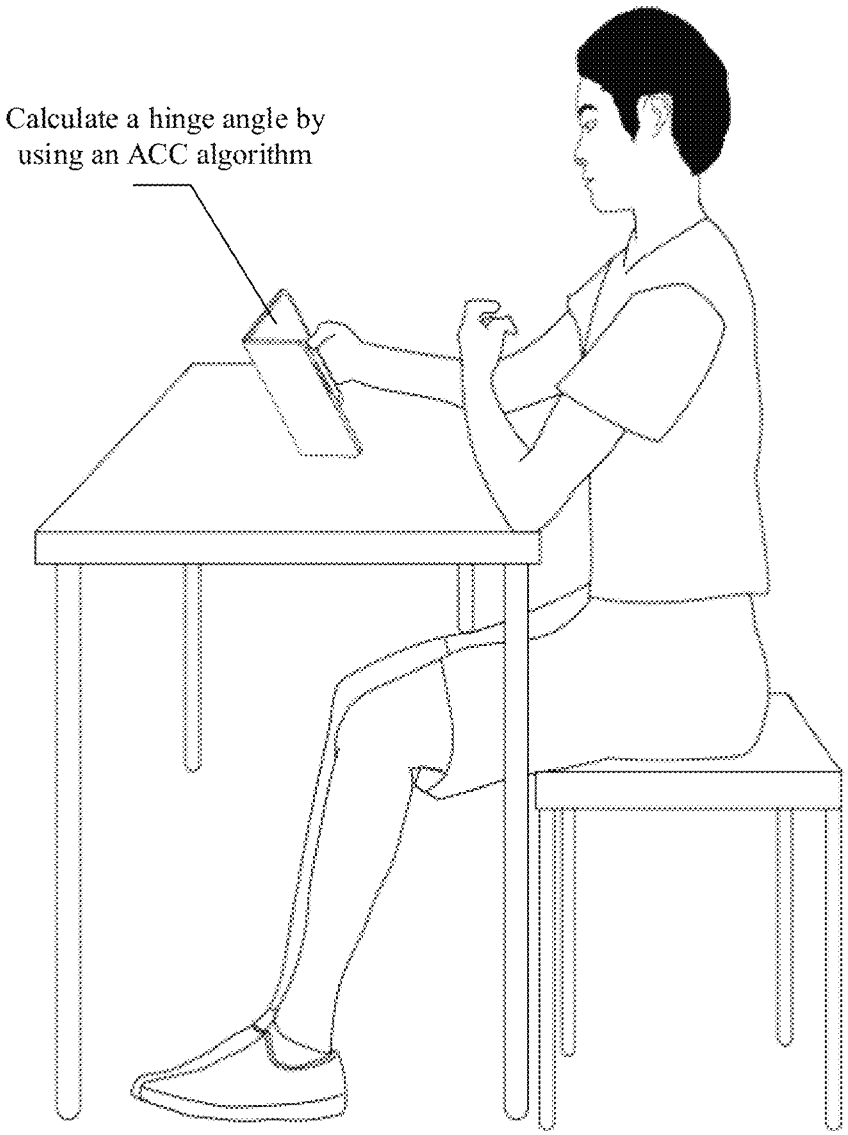
FIG. 7*c* is a diagram 2 of a scenario in which a foldable phone detects a hinge angle according to an embodiment of this application.

For example, in a scenario shown in FIG. 7*c*, the foldable phone is statically placed on a table by the user, and the folding edge is not perpendicular to the horizontal plane. In this case, the foldable phone calculates a hinge angle by using the ACC algorithm.

In some embodiments, the angle algorithm module obtains the acceleration vector ($A_1$, $B_1$, $C_1$) collected by the first acceleration sensor and the acceleration vector ($A_2$, $B_2$, $C_2$) collected by the second acceleration sensor, substitutes the acceleration vectors into the foregoing formula 1 to obtain cos θ through calculation and determine θ, and further calculates the hinge angle based on a fact that the hinge angle α is equal to 180 minus θ.

In some other embodiments, because the y-axis of the first-screen coordinate system and the y-axis of the second-screen coordinate system are the same, the angle algorithm module may alternatively obtain the projection ($A_1$, $C_1$) that is of the acceleration vector collected by the first acceleration sensor and that is on the x1o1z1 plane and the projection ($A_2$, $C_2$) that is of the acceleration vector collected by the second acceleration sensor and that is on the x2o2z2 plane, substitute the projections into the foregoing formula 2 to obtain cos θ through calculation and determine θ, and further calculate the hinge angle based on a fact that the hinge angle α is equal to 180 minus θ.

Specifically, for a technical principle of the ACC algorithm, refer to the foregoing related description of the ACC algorithm. Details are not described herein again. For descriptions of the first acceleration sensor and the second acceleration sensor, refer to a related part shown in FIG. 2*a*. Details are not described herein again.

In the still state, although the hinge angle does not change, the ACC algorithm may still be used to calculate a hinge angle with relatively high accuracy. When an error exists in the previously obtained hinge angle, an accurate hinge angle may be calculated by using the ACC algorithm, to correct the error in the previous calculation process.

S408. The angle algorithm module determines whether a common axis is perpendicular to a horizontal plane.

After the angle algorithm module determines in step S404 that the algorithm module is not in a still state, it indicates that the current acceleration of the foldable phone is not only affected by the gravitational acceleration but also affected by another acceleration. Therefore, the ACC algorithm is not suitable to be used, and whether the Gyro algorithm or the A+G fusion algorithm needs to be used to calculate a hinge angle further needs to be determined in step S408.

When it is determined that the common axis is perpendicular to the horizontal plane, it indicates that the hinge angle calculated by using the ACC algorithm cannot be used. Further, it indicates that the A+G fusion algorithm cannot be used. If the hinge angle needs to be calculated, the Gyro algorithm needs to be used. When it is determined that the common axis is not perpendicular to the horizontal plane, it indicates that the hinge angle calculated by using the ACC algorithm can be used. Therefore, the A+G fusion algorithm may be used to calculate the hinge angle.

According to step S408, which algorithm is currently suitable for calculating the hinge angle can be determined. However, after the available algorithm is determined by using step S408, whether the algorithm needs to be currently used to calculate a hinge angle further needs to be determined. Therefore, after it is determined that the common axis is perpendicular to the horizontal plane, and it is determined that the Gyro algorithm is suitable to be used, step S409 needs to be performed, to further determine whether the hinge angle changes, so as to determine whether the hinge angle needs to be currently calculated. Similarly, after it is determined that the common axis is not perpendicular to the horizontal plane, and it is determined that the A+G fusion algorithm is suitable to be used, step S410 needs to be performed, to further determine whether the hinge angle changes, so as to determine whether the hinge angle needs to be currently calculated.

For an execution process and a principle of step S408, refer to step S405. Details are not described herein again.

S409. The angle algorithm module determines whether the hinge angle changes.

When the angle algorithm module determines that the hinge angle does not change, step S411 is performed, that is, the hinge angle is not recalculated. When the angle algorithm module determines that the hinge angle changes, step S412 is performed, and the Gyro algorithm is used to calculate the hinge angle.

In some embodiments, an implementation of performing step S409 is as follows: The angle algorithm module determines, based on the angular velocity collected by the gyroscope sensor, whether the hinge angle changes. Specifically, a change of the hinge angle can be caused by a change of the angular velocity in the y-axis. Therefore, in some embodiments, the angle algorithm module may obtain the angular velocity Gyroy1 of rotating around the y1-axis that is collected by the first gyroscope sensor, and obtain the angular velocity Gyroy2 of rotating around the y2-axis that is collected by the second gyroscope sensor. When a difference between Gyroy2 and Gyroy1 is equal to 0 (or close to 0), that is, a difference between 0 and the difference (an angular velocity difference) between Gyroy2 and Gyroy1 is less than or equal to a second preset value, it indicates that the hinge angle does not change. The second preset value may be a value close to 0. On the contrary, when the difference between Gyroy1 and Gyroy2 is not equal to 0 (or is not close to 0), that is, the difference between 0 and the difference (the angular velocity difference) between Gyroy2 and Gyroy1 is greater than the second preset value, it indicates that the hinge angle changes.

S410. The angle algorithm module determines whether the hinge angle changes.

When the angle algorithm module determines that the hinge angle does not change, step S413 is performed, that is, the hinge angle is not recalculated. When the angle algorithm module determines that the hinge angle changes, step S414 is performed, and the A+G fusion algorithm is used to calculate the hinge angle.

Specifically, for a process and a principle of performing step S410 by the angle algorithm module, refer to step S409. Details are not described herein again.

S411. The angle algorithm module does not recalculate a hinge angle of the foldable screen.

When the foldable phone is not in the still state, and the common axis is perpendicular to the horizontal plane, it may be determined that an applicable algorithm is the Gyro algorithm. However, if it is determined that the hinge angle does not change, the hinge angle of the foldable screen may not be recalculated, but a hinge angle calculated last time may be directly used. In other words, the current hinge angle is no longer calculated in the current hinge angle detection process, but a hinge angle calculated last time (or the latest time) is used as the currently detected hinge angle.

Figure 7D:
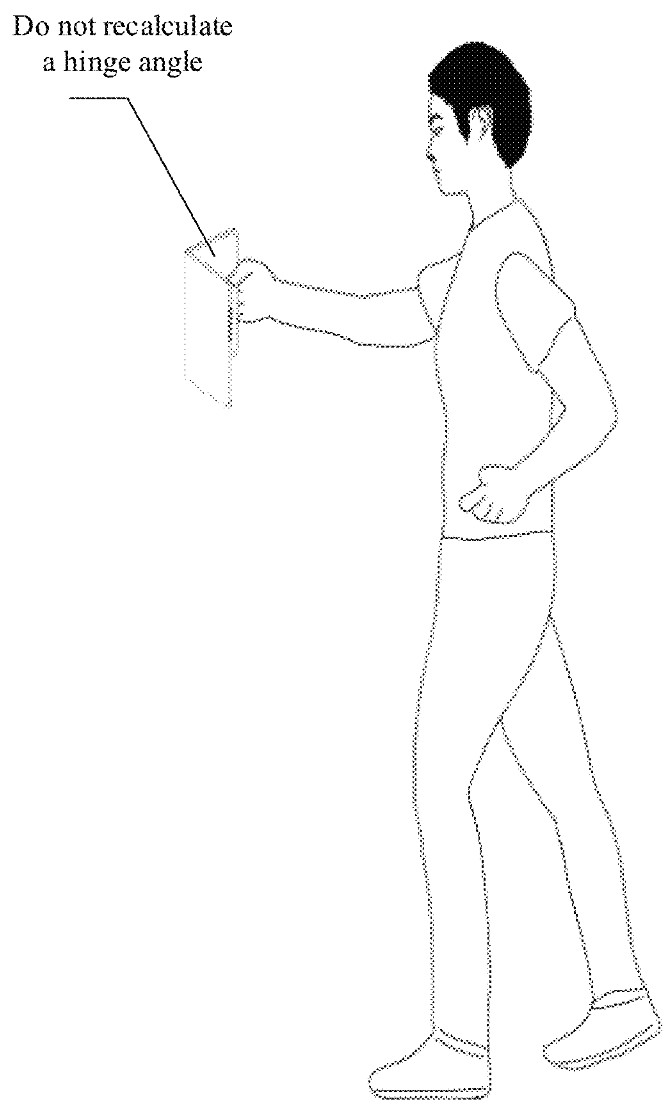
FIG. 7*d* is a diagram 3 of a scenario in which a foldable phone detects a hinge angle according to an embodiment of this application.

For example, in a scenario shown in FIG. 7*d*, in a walking process, the user holds the foldable phone for watching. In this case, the folding edge of the foldable phone is perpendicular to the horizontal plane. Although the foldable phone is not in the still state, because the user does not change a form of the foldable phone, that is, does not change a hinge angle, in the scenario shown in FIG. 7*d*, the foldable phone does not recalculate a hinge angle.

For an execution principle and a process of step S411, refer to step S406.

S412. The angle algorithm module calculates a hinge angle by using the Gyro algorithm.

By determining whether the foldable phone is in the still state and whether the common axis is perpendicular to the horizontal plane, it may be determined that when the foldable phone is not in the still state and the common axis is perpendicular to the horizontal plane, an applicable algorithm may be the Gyro algorithm. In addition, it is determined, by determining whether the hinge angle changes, that the current hinge angle changes. Therefore, the Gyro algorithm needs to be used to calculate the hinge angle.

Figure 7E:
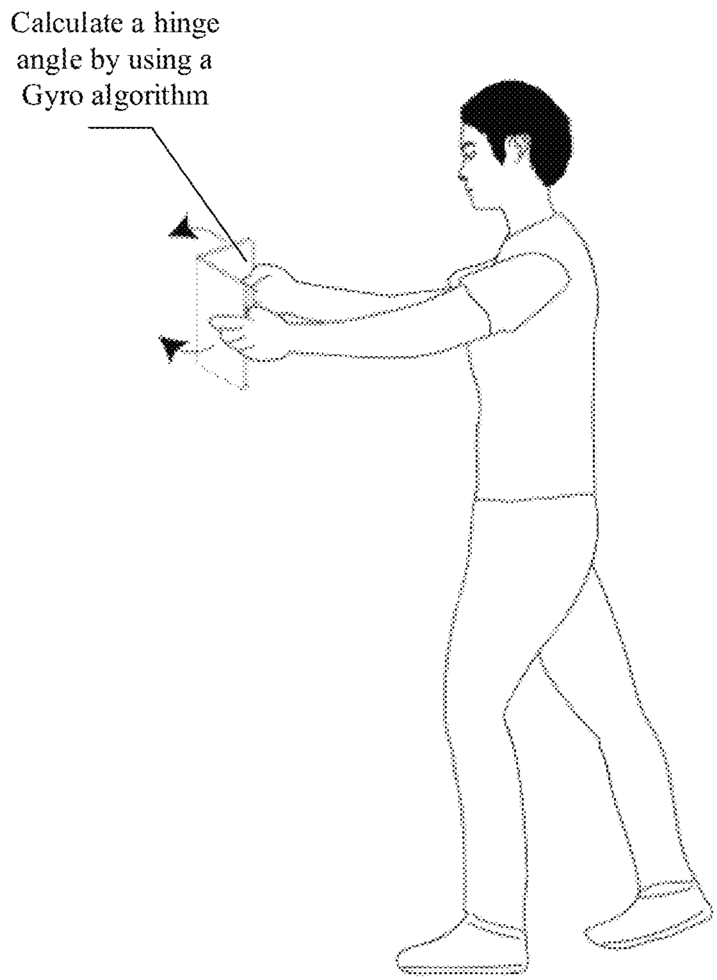
FIG. 7*e* is a diagram 4 of a scenario in which a foldable phone detects a hinge angle according to an embodiment of this application.

For example, in a scenario shown in FIG. 7*e*, the user is opening the foldable phone in a walking process. In this case, the folding edge is perpendicular to the ground and the foldable phone is not in the still state. Therefore, the foldable phone calculates a hinge angle by using the Gyro algorithm.

In some embodiments, the angle algorithm module obtains the angular velocity Gyroy1 of rotating around the y1-axis that is collected by the first gyroscope sensor and the angular velocity Gyroy2 of rotating around the y2-axis that is collected by the second gyroscope sensor, and substitutes Gyroy1, Gyroy2, and a hinge angle $\alpha$ obtained through calculation last time into the formula 3, to obtain the current hinge angle $\alpha$.

For a principle of the Gyro algorithm, refer to the foregoing description of the Gyro algorithm. Details are not described herein again.

S413. The angle algorithm module does not recalculate a hinge angle of the foldable screen.

By determining whether the foldable phone is in the still state and whether the common axis is perpendicular to the horizontal plane, it may be determined that when the foldable phone is not in the still state and the common axis is not perpendicular to the horizontal plane, an applicable algorithm may be the A+G fusion algorithm, but the hinge angle does not change. Therefore, the hinge angle of the foldable screen does not need to be recalculated, but a hinge angle calculated last time may be directly used. In other words, the current hinge angle is no longer calculated in the current hinge angle detection process, but a hinge angle calculated last time (or the latest time) is used as the currently detected hinge angle.

Figure 7F:
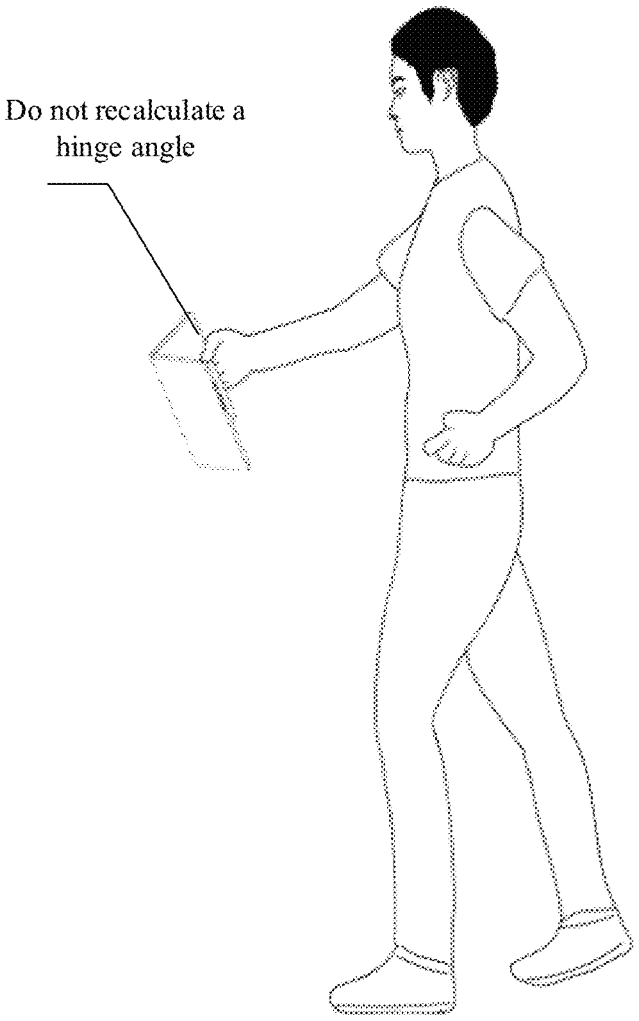
FIG. 7*f* is a diagram 5 of a scenario in which a foldable phone detects a hinge angle according to an embodiment of this application.

For example, as shown in FIG. 7*f*, in a walking process, the user holds the foldable phone for watching. In this case, the folding edge of the foldable phone is not perpendicular to the horizontal plane. Although the foldable phone is not in the still state, because the user does not change a form of the foldable phone, that is, does not change a hinge angle, in the scenario shown in FIG. 7*f*, the foldable phone does not recalculate a hinge angle.

S414. The angle algorithm module calculates a hinge angle by using the A+G fusion algorithm.

By determining whether the foldable phone is in the still state and whether the common axis is perpendicular to the horizontal plane, it may be determined that when the foldable phone is not in the still state and the common axis is not perpendicular to the horizontal plane, an applicable algorithm is the A+G fusion algorithm. In addition, it is determined, by determining whether the hinge angle changes, that the current hinge angle changes. Therefore, the A+G fusion algorithm needs to be used to calculate the hinge angle.

Figure 7G:
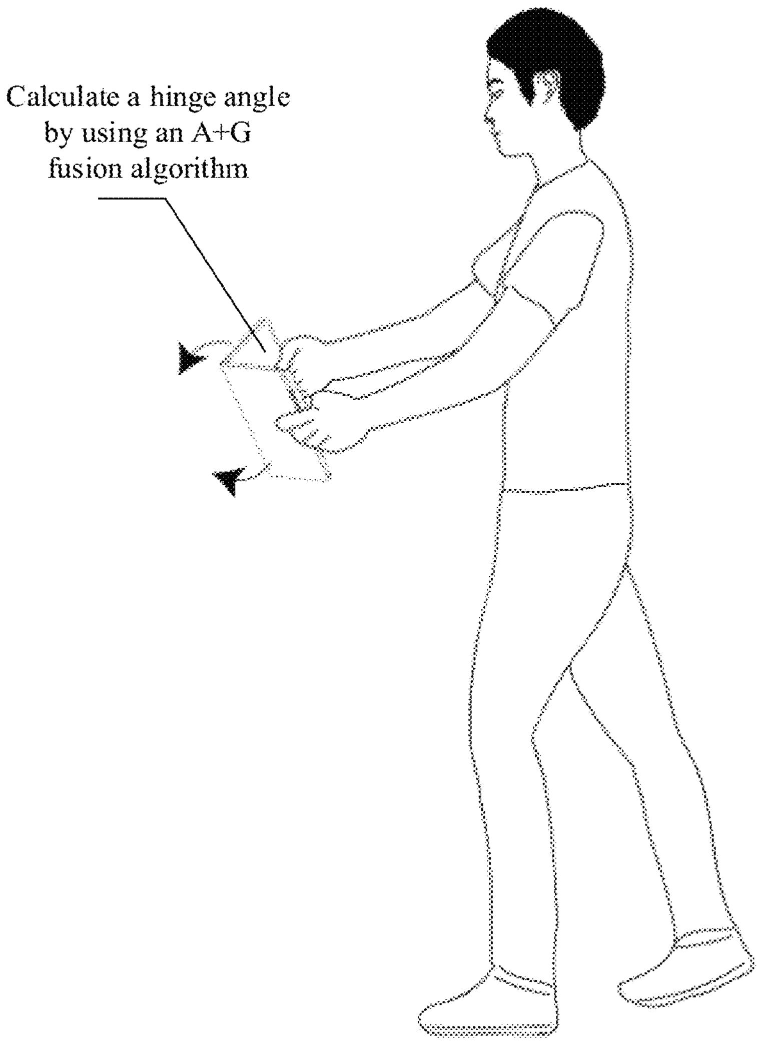
FIG. 7*g* is a diagram 6 of a scenario in which a foldable phone detects a hinge angle according to an embodiment of this application.

For example, as shown in FIG. 7*g*, the user is opening the foldable phone in a walking process. In this case, the foldable phone is not in the still state, and the folding edge is not perpendicular to the horizontal plane. Therefore, the foldable phone calculates a hinge angle by using the A+G fusion algorithm.

It should be noted that, when it is determined that the foldable phone is not in the still state and the common axis is not perpendicular to the horizontal plane, a reason for using the A+G fusion algorithm may be as follows: It can be learned by using (3) shown in FIG. 7*b* that when the hinge angle does not change, in a process in which a foldable phone whose hinge angle is 67 degrees changes from a still state to a shaking state and then to the still state, a hinge angle calculated by using the ACC algorithm in a shaking phase (that is, a non-still phase) is not accurate. Compared with the Gyro algorithm shown in (2), an error of a hinge angle calculated by using the Gyro algorithm increases with time. A hinge angle calculated by using the A+G fusion algorithm based on Kalman filtering in (3) is stable at 67 degrees regardless of a motion status. Therefore, when the foldable phone is not in the still state, and the common axis is not perpendicular to the horizontal plane, the A+G fusion algorithm with high accuracy may be used.

In some other embodiments, for example, in a scenario in which an accuracy requirement for a hinge angle is relatively low, the algorithm used to calculate the hinge angle in step S414 may be the Gyro algorithm.

In some embodiments, the angle algorithm module may input a hinge angle Angle currently calculated by using the ACC algorithm, the angular velocity Gyroy1 of rotating around the y1-axis that is collected by the first gyroscope sensor, the angular velocity Gyroy2 of rotating around the y2-axis that is collected by the second gyroscope sensor, a preset process covariance Q, and a preset key parameter measurement error R into an A+G fusion algorithm model constructed based on Kalman filtering, and after N times of iteration in the model, output an estimated hinge angle eAngle as a hinge angle currently detected by the angle algorithm module. A value of N may be set according to experience. For example, when it is determined, according to experience, that N is 150 times, an error between the output eAngle and a real hinge angle is relatively small. Therefore, N may be set to 150. Specifically, for a technical principle of the A+G fusion algorithm, refer to the foregoing description of the A+G fusion algorithm. Details are not described herein again.

It should be noted that step S404 to step S414 are merely an example of a process of calculating a hinge angle once. If the hinge angle needs to be detected again, step S404 to step S414 are repeatedly performed.

It should be further noted that in some other embodiments, step S401 to step S403 may not be performed, that is, the angle algorithm module may be always in a start state, that is, a hinge angle is always detected.

It can be learned from the foregoing step S404 to step S414 that in this embodiment of this application, the angle algorithm module determines a current motion status (that is, whether the current motion status is the still state) and a relative position relationship between the common axis of the foldable screen and the horizontal plane (that is, whether the common axis is perpendicular to the horizontal plane) by using step S404, step S405, and step S408. Further, a target algorithm (that is, a hinge angle algorithm with higher calculation accuracy in a current scenario) may be obtained from the ACC algorithm, the Gyro algorithm, and the A+G fusion algorithm through matching based on the current motion status and the relative position relationship between the common axis and the horizontal plane. Specifically, when the foldable phone is in the still state and the common axis is not perpendicular to the horizontal plane, the ACC algorithm is used as the target algorithm to calculate a hinge angle. When the foldable phone is not in the still state and the common axis is perpendicular to the horizontal plane, the Gyro algorithm is used as the target algorithm to calculate a hinge angle. When the foldable phone is not in the still state and the common axis is not perpendicular to the horizontal plane, the A+G fusion algorithm is used as the target algorithm to calculate a hinge angle.

In step S409 and step S410, after it is determined that the foldable phone is not in the still state, whether the determined target algorithm needs to be used to calculate the hinge angle is further determined based on whether the hinge angle changes. If the hinge angle does not change, the hinge angle may not be calculated, so that power consumption is reduced, and running efficiency is improved. In some other embodiments, when it is determined in step S404 that the foldable phone is in the still state and it is determined in step S405 that the common axis is not perpendicular to the horizontal plane, whether the determined target algorithm (ACC algorithm) needs to be used may also be determined based on whether the hinge angle changes.

In some other embodiments, step S409 and step S410 may not be performed. That is, after it is determined in step S408 that the common axis is perpendicular to the horizontal plane, step S412 may be directly performed to calculate a hinge angle. After it is determined that the common axis is not perpendicular to the horizontal plane, step S414 may be directly performed to calculate a hinge angle.

It should be noted that a sequence of determining whether the foldable phone is in the still state, determining whether the common axis is perpendicular to the horizontal plane, and determining whether the hinge angle algorithm changes does not affect implementation of this embodiment of this application.

It can be learned from the foregoing step S401 to step S403 that a purpose of step S401 to step S403 is as follows: The foldable electronic device starts hinge angle detection only when the foldable screen is not in a closed state, and stops hinge angle detection when the foldable screen is in a closed state. Whether the purpose is specifically implemented through cooperation between the closure detection algorithm module and the angle algorithm module or by using only one module is not limited in this embodiment of this application. In addition to the angle algorithm module, an execution module of step S404 to step S414 may be one or more other modules. This embodiment of this application sets no limitation on a specific execution module of the hinge angle detection method shown in FIG. 4*b*.

Because the electronic device uses different hinge angle algorithms in different scenarios (that is, different motion statuses and different relative position relationships between the common axis and the horizontal plane), accuracy of calculated hinge angles is different. Therefore, in this embodiment of this application, the target algorithm is obtained from a plurality of hinge angle algorithms through matching by using the current motion status of the foldable electronic device and the relative position relationship between the common axis of the foldable screen and the horizontal plane, and then the target algorithm is used to calculate a hinge angle, so that a more accurate hinge angle can be obtained. In this embodiment of this application, in a hinge angle detection process, impact caused by the motion status and the relative position relationship between the common axis of the foldable screen and the horizontal plane on accuracy of the hinge angle algorithm is considered, so that a more accurate hinge angle can be calculated, and a function that needs to use the hinge angle in the electronic device is optimized.

The following is experiments of comparison between a foldable phone that uses the self-developed algorithm provided in FIG. 4*b* in embodiments of this application and a foldable phone that uses another hinge angle algorithm X2.

Experiment 1: For the foldable phone using the self-developed algorithm and the foldable phone using the algorithm X2, a hinge angle of a foldable screen is collected at a frequency of 50 Hz, high-frequency folding is performed 39 times, and a folding speed is averaged 1 second per time.

Figure 8A:
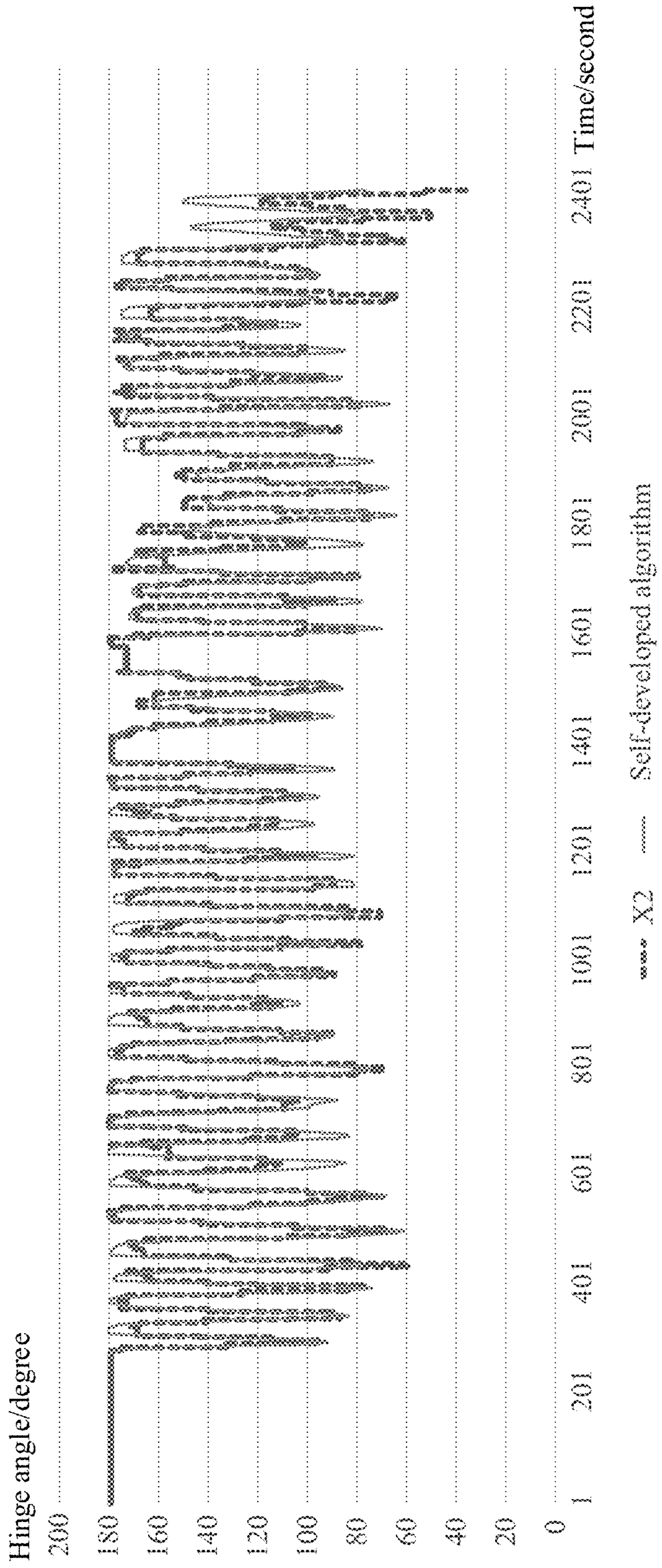
FIG. 8*a* is a schematic diagram of a hinge angle change corresponding to an experiment 1 according to an embodiment of this application.

As shown in FIG. 8*a*, it can be learned that a curve change of a hinge angle detected by using the algorithm X2 is not smooth, and a detected hinge angle jump exists. For example, at second 401 and second 801, a hinge angle jump change exists. A change curve of the self-developed algorithm is smoother. At the end of the experiment 1, a common axis is perpendicular to a table surface, and a real value of a hinge angle is about 80 degrees. A screen-off phenomenon occurs on the foldable phone that uses the algorithm X2, a detected hinge angle is 35 degrees, and an obvious error occurs. The self-developed algorithm accurately detects a hinge angle about 80 degrees.

Therefore, it can be learned from the experiment 1 that, in a scenario of high-frequency folding motion, accuracy of the self-developed algorithm in embodiments of this application is higher than accuracy of the algorithm X2.

Experiment 2: For the foldable phone using the self-developed algorithm and the foldable phone using the algorithm X2, low-speed folding is performed 33 times, and a folding speed is averaged 2.57 seconds per time.

Figure 8B:
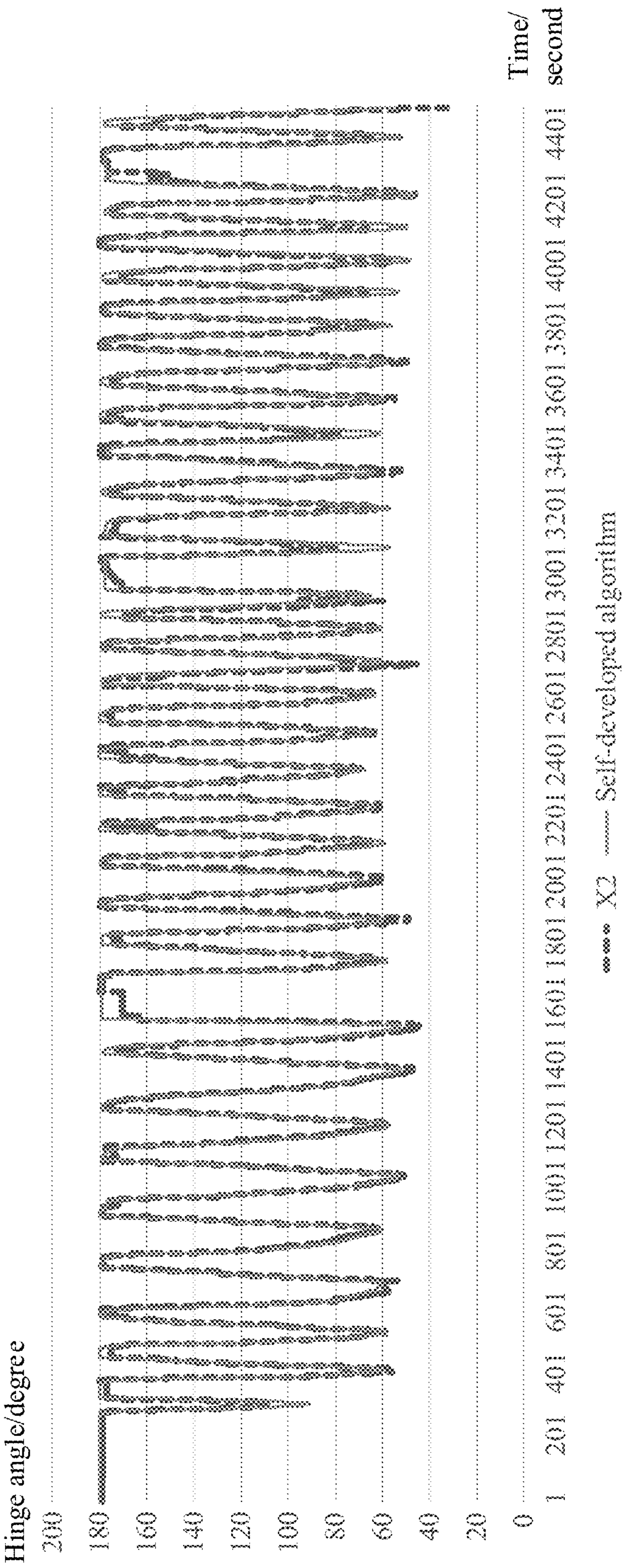
FIG. 8*b* is a schematic diagram of a hinge angle change corresponding to an experiment 2 according to an embodiment of this application.

As shown in FIG. 8*b*, in a case of low-speed folding, the self-developed algorithm is smoother than the algorithm X2, and the algorithm X2 has an angle jump problem (for example, a jump occurs at about second 1601 and seconds 1801 to 2001). An actual hinge angle at the end of the experiment 2 is 73 degrees, a calculation result of X2 is 32 degrees, a calculation result of the self-developed algorithm is 54 degrees, and an error of the self-developed algorithm is less than that of the algorithm X2. In addition, in the algorithm X2, a screen-off phenomenon occurs in a low-speed folding process.

Therefore, it can be learned from the experiment 2 that, in a scenario of low-frequency folding motion, accuracy of the self-developed algorithm in embodiments of this application is higher than accuracy of the algorithm X2.

Experiment 3: For the foldable phone using the self-developed algorithm and the foldable phone using the algorithm X2, folding is performed 4.7 minutes when the user walks, folding is paused in the middle (about seconds 11476 to 12241), and whether a hinge angle can be converged is checked.

Figure 8C:
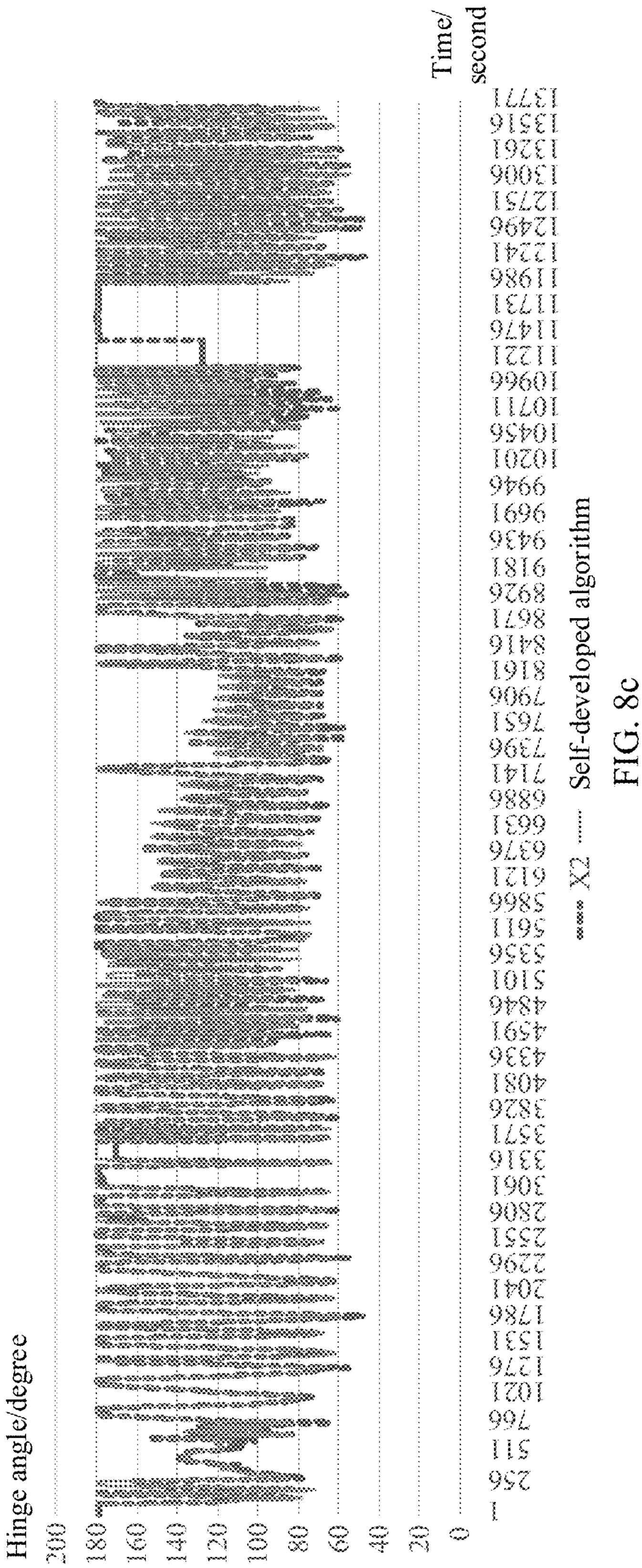
FIG. 8*c* is a schematic diagram of a hinge angle change corresponding to an experiment 3 according to an embodiment of this application.

As shown in FIG. 8*c*, in a walking process, when low-frequency folding is performed, detection accuracy of the self-developed algorithm and detection accuracy of the algorithm X2 are equivalent. When high-frequency folding is performed, X2 encounters an angle jump and non-smoothness, and a calculated angle that is less than an actual angle easily appears. When unfolding is paused in the middle, an error occurs in the algorithm X2, and then is gradually restored and converged.

Therefore, it can be learned from the experiment 3 that, in a scenario in which the user folds a foldable screen in a walking state, accuracy of the self-developed algorithm in embodiments of this application is higher than accuracy of the algorithm X2.

What is claimed is:

1. A hinge angle detection method, applied to a foldable electronic device having a foldable screen, the foldable screen including a first screen and a second screen and the hinge angle being an included angle between the first screen and the second screen, the method comprising:

determining an initial hinge angle based on a norm of a magnetic vector determined from magnetic force data, wherein the foldable screen is in a closed state if the initial hinge angle is less than a preset angle and, based on the foldable screen being not in a closed state, detecting the hinge angle by a process comprising:

determining, by a processor of the foldable electronic device, a motion status of the electronic device and a relative position between a common axis and a horizontal plane, wherein the common axis is an axis on which a folding edge of the foldable screen is located;

determining, by the processor, a target algorithm based on the motion status and the relative position, wherein the target algorithm comprises an acceleration sensor algorithm, a gyroscope sensor algorithm, or a fusion algorithm, and the fusion algorithm is an algorithm of fusing data of an acceleration sensor and data of a gyroscope sensor to calculate a hinge angle, wherein the determining the target algorithm based on the motion status and the relative position comprises:

determining the acceleration sensor algorithm as the target algorithm based on the electronic device being in a still state and the common axis not being perpendicular to the horizontal plane, determining the gyroscope sensor algorithm as the target algorithm based on the electronic device being in a motion state, the common axis being perpendicular to the horizontal plane, and the hinge angle changing, and determining the fusion algorithm as the target algorithm based on the electronic device being in a motion state, the common axis not being perpendicular to the horizontal plane, and the hinge angle changing, calculating, by the processor, a hinge angle using the target algorithm, wherein based on the target algorithm being the gyroscope sensor algorithm or the fusion algorithm, the hinge angle is iteratively updated starting from the initial hinge angle; and altering a still or moving image displayed on the foldable screen based on the calculated hinge angle.

2. The hinge angle detection method according to claim 1, wherein the motion status of the electronic device comprises: the electronic device is in the still state or is not in the still state; and the relative position between the common axis and the horizontal plane comprises: the common axis is perpendicular to the horizontal plane or the common axis is not perpendicular to the horizontal plane.

3. The hinge angle detection method according to claim 1, wherein the determining a motion status of the electronic device comprises:

if a difference between a norm of an acceleration vector of the electronic device and a gravitational acceleration is less than or equal to a first preset value, determining, by the processor, that the motion status of the electronic device is the still state; or if the difference between the norm of the acceleration vector and the gravitational acceleration is greater than the first preset value, determining, by the processor, that the motion status of the electronic device is not the still state.

4. The hinge angle detection method according to claim 1, wherein a process of determining the relative position between the common axis and the horizontal plane comprises:

if a difference between a component of an acceleration vector on the common axis and a gravitational acceleration is less than or equal to a first preset value, determining, by the processor, that the common axis is perpendicular to the horizontal plane; or if the difference between the component of the acceleration vector on the common axis and the gravitational acceleration is greater than the first preset value, determining, by the processor, that the common axis is not perpendicular to the horizontal plane.

5. The hinge angle detection method according to claim 1, wherein the calculating a hinge angle of the electronic device by using the determined target algorithm comprises:

calculating, by the processor, the hinge angle of the electronic device by using the determined target algorithm if determining that the hinge angle changes.

6. The hinge angle detection method according to claim 5, wherein the determining that the hinge angle changes comprises:

if a difference between an angular velocity difference and zero is greater than a second preset value, determining, by the processor, that the hinge angle changes, wherein the angular velocity difference is a difference between an angular velocity of a first gyroscope sensor around the common axis and an angular velocity of a second gyroscope sensor around the common axis, the first gyroscope sensor is disposed in a body corresponding to the first screen, and the second gyroscope sensor is disposed in a body corresponding to the second screen.

7. The hinge angle detection method according to claim 1, wherein the magnetic force data is obtained by a magnetic sensor by detecting magnetic field strength of a magnet, the magnetic sensor is disposed in a body corresponding to the first screen, and the magnet is disposed in the body corresponding to the second screen.

8. The hinge angle detection method according to claim 7, wherein the determining, based on magnetic force data, that the foldable screen is not in the closed state comprises:

if the magnetic force data is less than or equal to a first preset magnetic force value, determining, by the processor, that the foldable screen is not in the closed state.

9. The hinge angle detection method according to claim 1, wherein if the target algorithm is the fusion algorithm, the calculating a hinge angle of the electronic device by using the determined target algorithm comprises:

obtaining, by the processor, the hinge angle of the electronic device through calculation by using the fusion algorithm based on an angular velocity around the common axis that is collected by a first gyroscope sensor, the angular velocity around the common axis that is collected by a second gyroscope sensor, a hinge angle calculated by using the acceleration sensor algorithm, a sampling cycle, a process covariance, and a key parameter measurement error, wherein the fusion algorithm is constructed based on a Kalman filtering algorithm, the first gyroscope sensor is disposed in a body corresponding to the first screen, and the second gyroscope sensor is disposed in the body corresponding to the second screen.

10. The hinge angle detection method according to claim 1, wherein if the target algorithm is the acceleration sensor algorithm, the calculating a hinge angle of the electronic device by using the determined target algorithm comprises:

obtaining, by the processor, the hinge angle of the electronic device through calculation by using the acceleration sensor algorithm based on a projection vector of an acceleration vector on an x1o1z1 plane of a first-screen coordinate system and a projection vector of the acceleration vector on an x2o2z2 plane of a second-screen coordinate system, wherein the projection vector of the acceleration vector on the x1o1z1 plane of the first-screen coordinate system is collected by a first acceleration sensor, the projection vector of the acceleration vector on the x2o2z2 plane of the second-screen coordinate system is collected by a second acceleration sensor, the first acceleration sensor is disposed in a body corresponding to the first screen, the second acceleration sensor is disposed in the body corresponding to the second screen, and a y1-axis of the first-screen coordinate system is parallel to a y2-axis of the second-screen coordinate system.

11. The hinge angle detection method according to claim 1, wherein if the target algorithm is the gyroscope sensor algorithm, the calculating a hinge angle of the electronic device by using the determined target algorithm comprises:

obtaining, by the processor, the hinge angle of the electronic device through calculation by using the gyroscope sensor algorithm based on an angular velocity around the common axis that is collected by a first gyroscope sensor, the angular velocity around the common axis that is collected by a second gyroscope sensor, a hinge angle calculated last time, and a sampling cycle, wherein the first gyroscope sensor is disposed in a body corresponding to the first screen, and the second gyroscope sensor is disposed in the body corresponding to the second screen.

12. A foldable electronic device, comprising:

a foldable screen, wherein the foldable screen comprises a first screen and a second screen and a hinge angle is an included angle between the first screen and the second screen;

one or more processors; and a memory, storing a program, wherein when the program is executed by the one or more processors, the foldable electronic device is enabled to:

determine an initial hinge angle based on a norm of a magnetic vector determined from magnetic force data, wherein the foldable screen is in a closed state if the initial hinge angle is less than a preset angle and, if the foldable screen is not in a closed state, the foldable electronic device is enabled to determine the hinge angle by executing instructions in the program to:

determine a motion status of the electronic device and a relative position between a common axis and a horizontal plane, wherein the common axis is an axis on which a folding edge of the foldable screen is located, determine a target algorithm based on the motion status and the relative position, wherein the target algorithm comprises an acceleration sensor algorithm, a gyroscope sensor algorithm, or a fusion algorithm, and the fusion algorithm is an algorithm of fusing data of an acceleration sensor and data of a gyroscope sensor to calculate a hinge angle, wherein to determine the target algorithm based on the motion status and the relative position, the foldable electronic device is enabled to:

determine the acceleration sensor algorithm as the target algorithm based on the electronic device being in a still state and the common axis not being perpendicular to the horizontal plane, determine the gyroscope sensor algorithm as the target algorithm based on the electronic device being in a motion state, the common axis being perpendicular to the horizontal plane, and the hinge angle changing, and determine the fusion algorithm as the target algorithm based on the electronic device being in a motion state, the common axis not being perpendicular to the horizontal plane, and the hinge angle changing;

calculate a hinge angle using the target algorithm, wherein based on the target algorithm being the gyroscope sensor algorithm or the fusion algorithm, the hinge angle is iteratively updated starting from the initial hinge angle; and alter a still or moving image displayed on the foldable screen based on the calculated hinge angle.

13. The electronic device according to claim 12, wherein the motion status of the electronic device comprises: the electronic device is in the still state or is not in the still state; and the relative position between the common axis and the horizontal plane comprises: the common axis is perpendicular to the horizontal plane or the common axis is not perpendicular to the horizontal plane.

14. The electronic device according to claim 12, wherein the determining a motion status of the electronic device comprises:

if a difference between a norm of an acceleration vector of the electronic device and a gravitational acceleration is less than or equal to a first preset value, determine that the motion status of the electronic device is the still state; or if the difference between the norm of the acceleration vector and the gravitational acceleration is greater than the first preset value, determine that the motion status of the electronic device is not the still state.

15. The electronic device according to claim 12, wherein to determine the relative position between the common axis and the horizontal plane, the foldable electronic device is enabled to:

if a difference between a component of an acceleration vector on the common axis and a gravitational acceleration is less than or equal to a first preset value, determine that the common axis is perpendicular to the horizontal plane; or if the difference between the component of the acceleration vector on the common axis and the gravitational acceleration is greater than the first preset value, determine that the common axis is not perpendicular to the horizontal plane.

16. The electronic device according to claim 12, wherein to determine that the hinge angle changes, the foldable electronic device is enabled to:

if a difference between an angular velocity difference and zero is greater than a second preset value, determine that the hinge angle changes, wherein the angular velocity difference is a difference between an angular velocity of a first gyroscope sensor around the common axis and an angular velocity of a second gyroscope sensor around the common axis, the first gyroscope sensor is disposed in a body corresponding to the first screen, and the second gyroscope sensor is disposed in a body corresponding to the second screen.

* * * * *